(12) United States Patent
Baglione

(10) Patent No.: US 7,971,558 B2
(45) Date of Patent: Jul. 5, 2011

(54) CIRCULATING FLUIDIZED BED REACTOR WITH SEPARATOR AND INTEGRATED ACCELERATION DUCT

(75) Inventor: Daniel Baglione, Gentilly (FR)

(73) Assignee: ALSTOM Technology Ltd, Baden (CH)

( * ) Notice: Subject to any disclaimer, the term of this patent is extended or adjusted under 35 U.S.C. 154(b) by 174 days.

(21) Appl. No.: 10/531,064

(22) PCT Filed: Oct. 7, 2003

(86) PCT No.: PCT/FR03/50081
§ 371 (c)(1),
(2), (4) Date: May 19, 2005

(87) PCT Pub. No.: WO2004/036118
PCT Pub. Date: Apr. 29, 2004

(65) Prior Publication Data
US 2006/0011148 A1 Jan. 19, 2006

(30) Foreign Application Priority Data

Oct. 14, 2002 (FR) ..................................... 02 12762

(51) Int. Cl.
*F23C 10/08* (2006.01)
(52) U.S. Cl. ..................... 122/4 D; 122/488; 209/711
(58) Field of Classification Search ................. 122/4 D, 122/7 R, 488, 490; 209/717, 719, 134–139.1, 209/142, 143, 710, 711; 55/459.4–459.5, 345, 459.1; 422/145, 147
See application file for complete search history.

(56) References Cited

U.S. PATENT DOCUMENTS

| | | | |
|---|---|---|---|
| 3,925,045 A | 12/1975 | Cheng | |
| 4,469,050 A * | 9/1984 | Korenberg | 122/4 D |
| 4,867,948 A | 9/1989 | Ruottu | |
| 5,203,284 A * | 4/1993 | Dietz | 122/4 D |
| 5,471,955 A * | 12/1995 | Dietz | 122/4 D |
| 5,771,844 A * | 6/1998 | Dietz | 122/4 D |
| 6,779,492 B2 * | 8/2004 | Baglione et al. | 122/4 D |
| 6,938,780 B2 * | 9/2005 | Baglione et al. | 209/717 |
| 7,194,983 B2 * | 3/2007 | Kokko | 122/4 D |
| 2006/0000425 A1 * | 1/2006 | Kokko | 122/4 D |
| 2007/0079773 A1 * | 4/2007 | Morin et al. | 122/459 |

FOREIGN PATENT DOCUMENTS

| | | |
|---|---|---|
| DE | 196 04 565 A | 8/1997 |
| EP | 0 481 438 A | 4/1992 |
| EP | 0 559 388 A | 9/1993 |
| EP | 0 730 910 A | 9/1996 |
| EP | 0 990 467 A | 4/2000 |
| EP | 1 308 213 A | 5/2003 |
| WO | WO 88/05336 A | 7/1988 |

* cited by examiner

*Primary Examiner* — Gregory A Wilson
(74) *Attorney, Agent, or Firm* — Robert D. Crawford

(57) ABSTRACT

A circulating fluidized bed including a reaction chamber connected by an acceleration duct to a centrifugal separator which separates hot gas particles derived from the chamber. The acceleration duct is arranged partly in the upper part of the chamber.

35 Claims, 26 Drawing Sheets

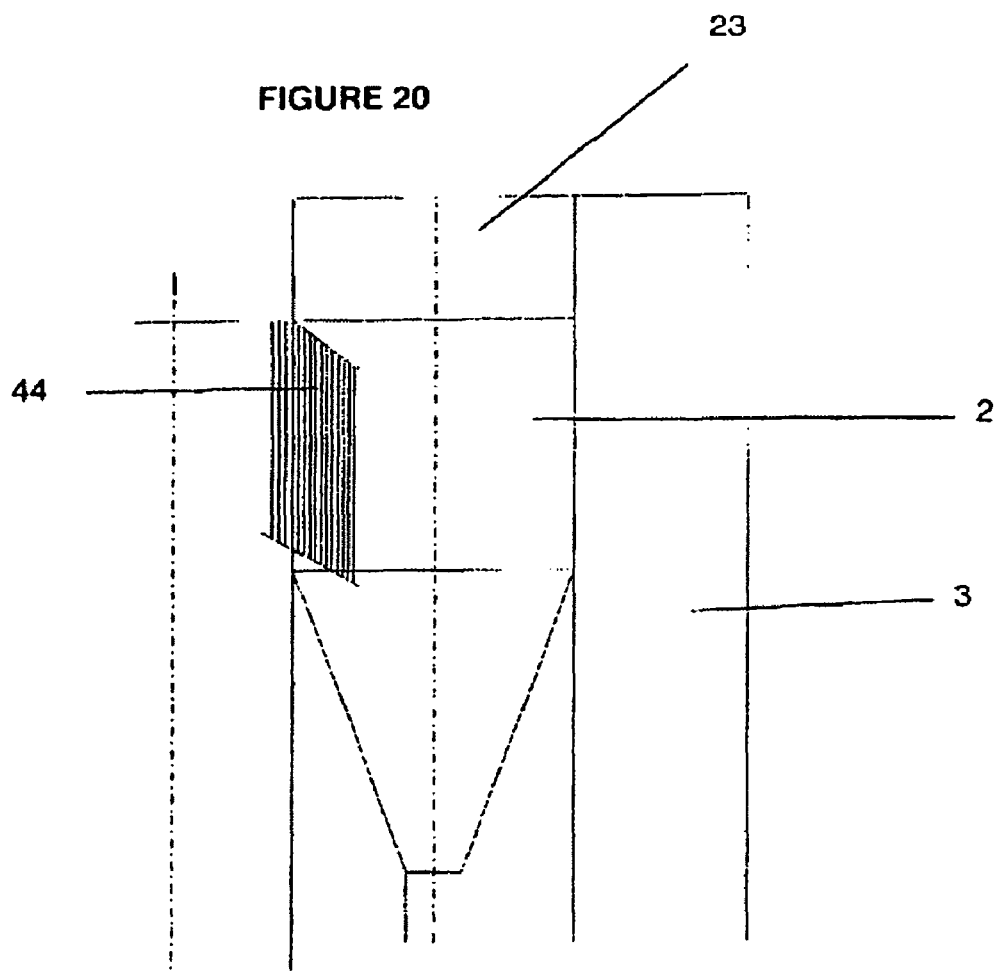
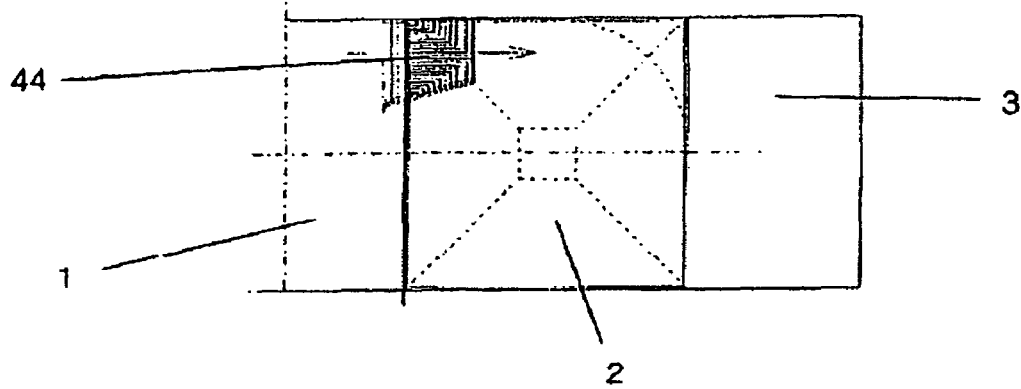

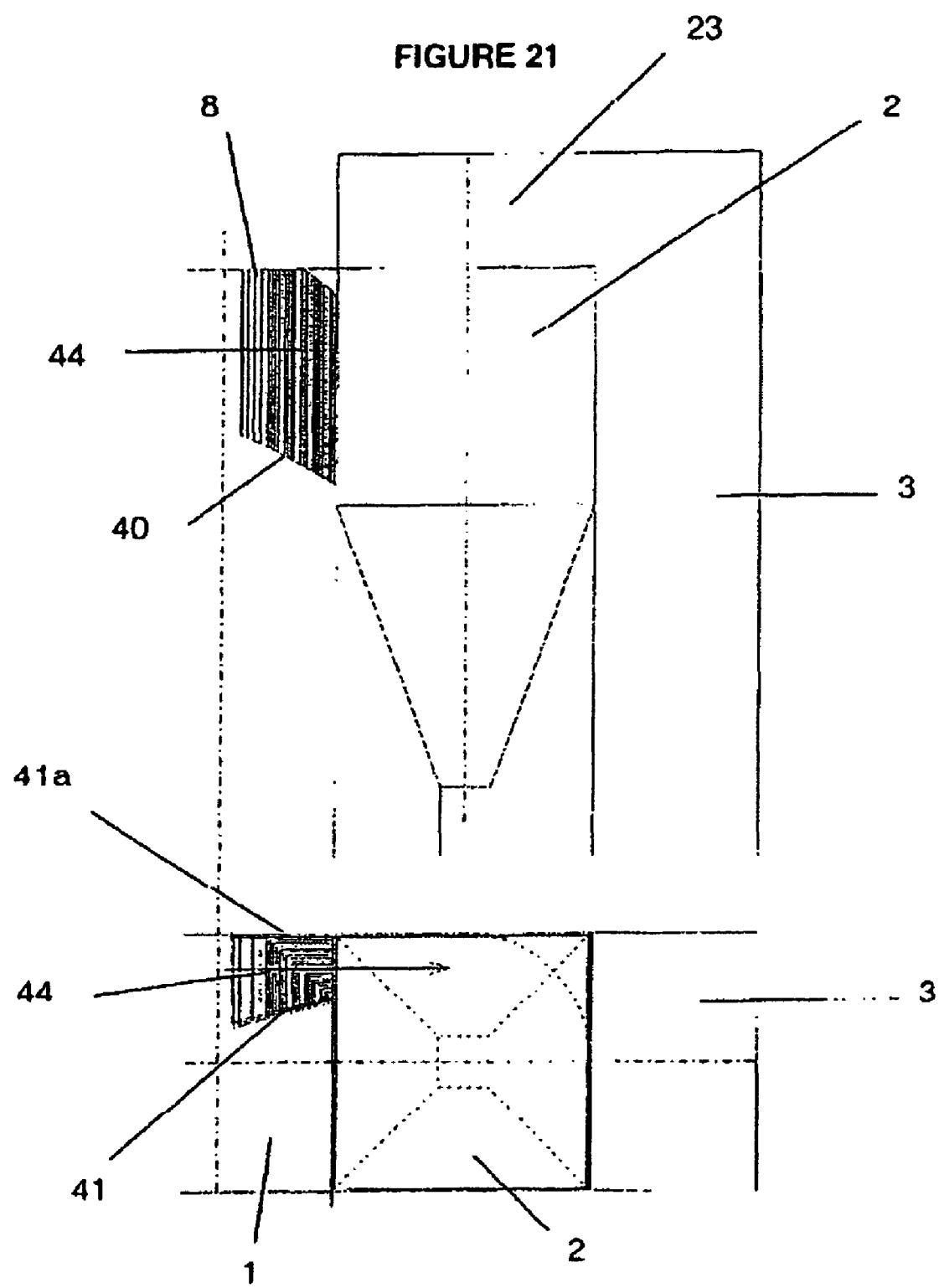

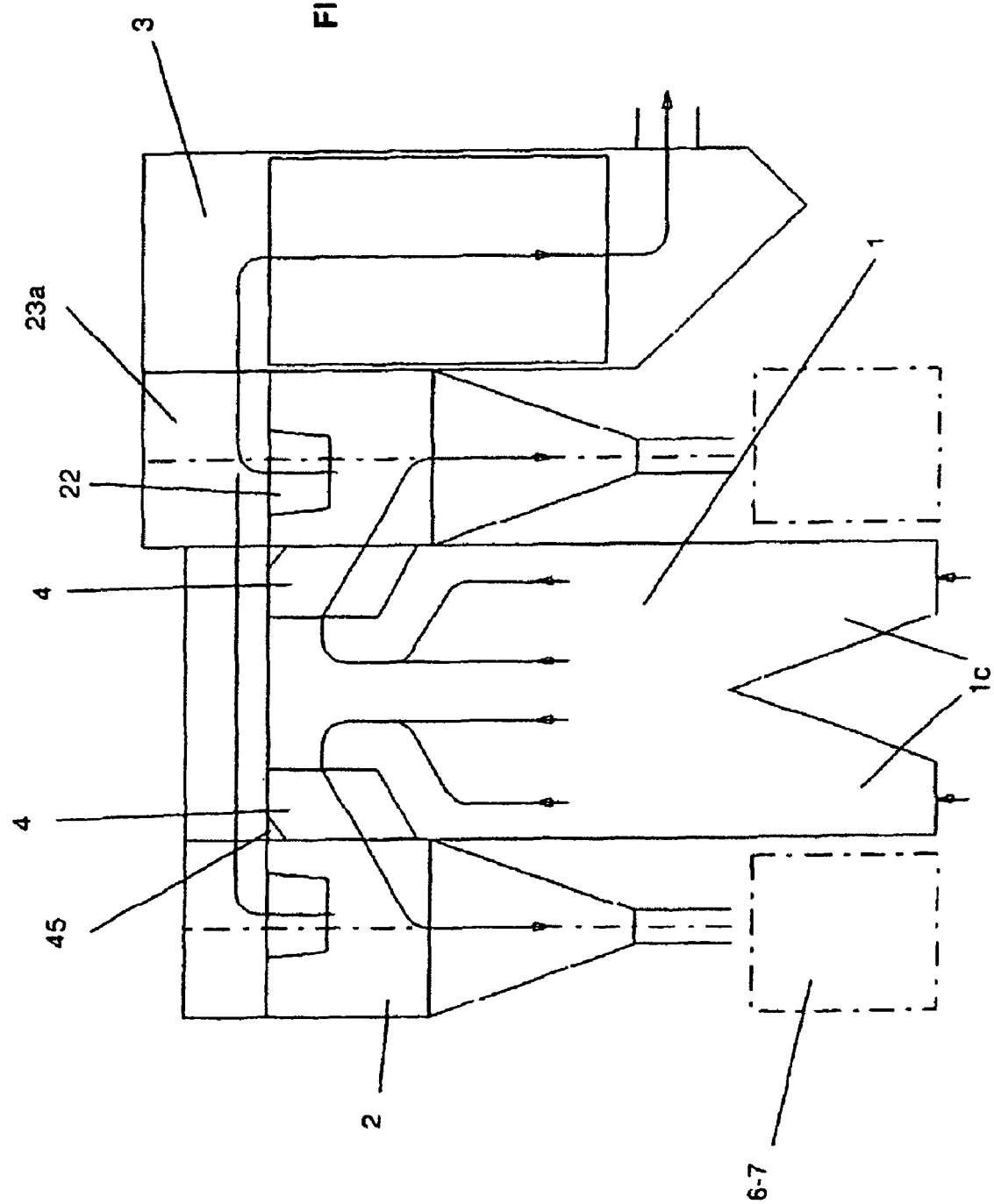

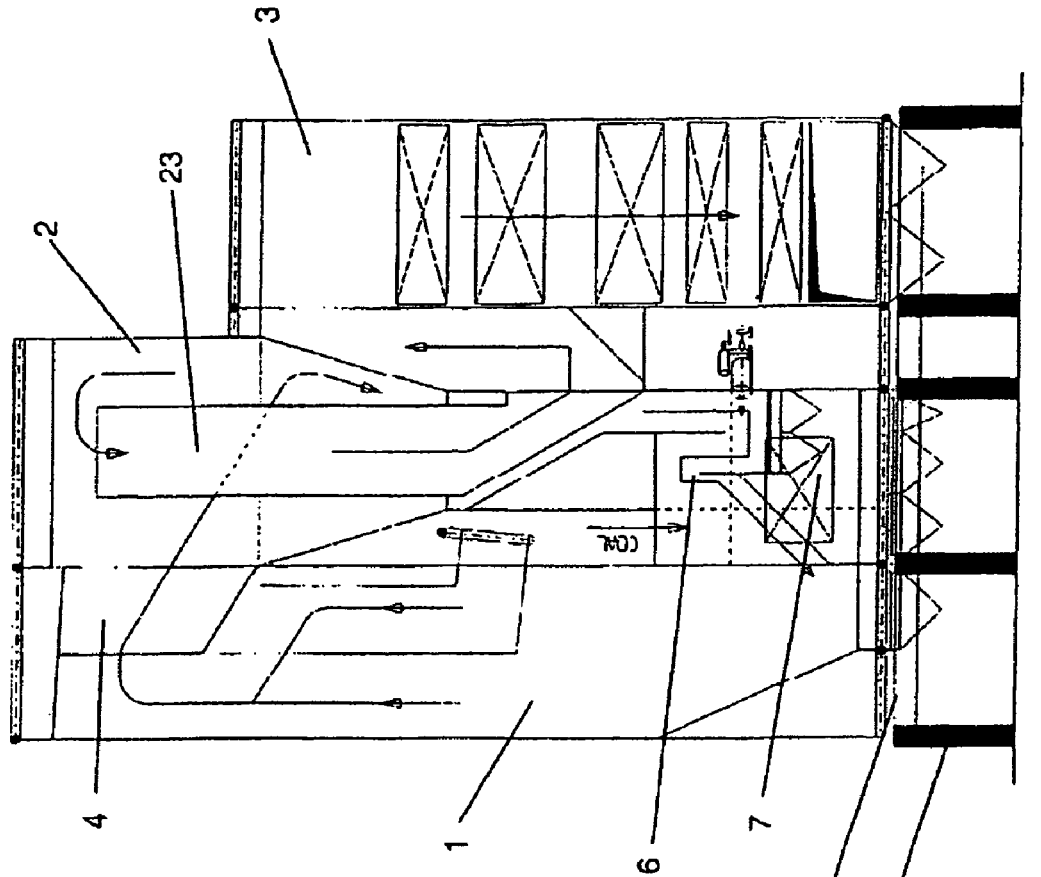
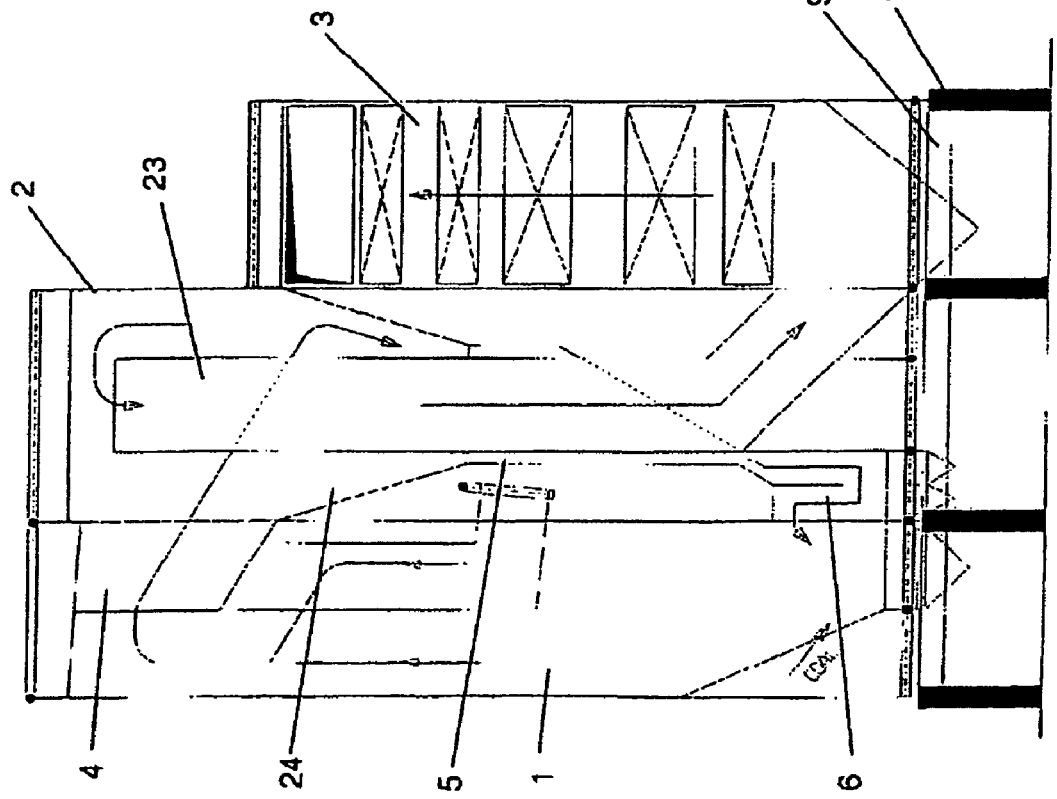

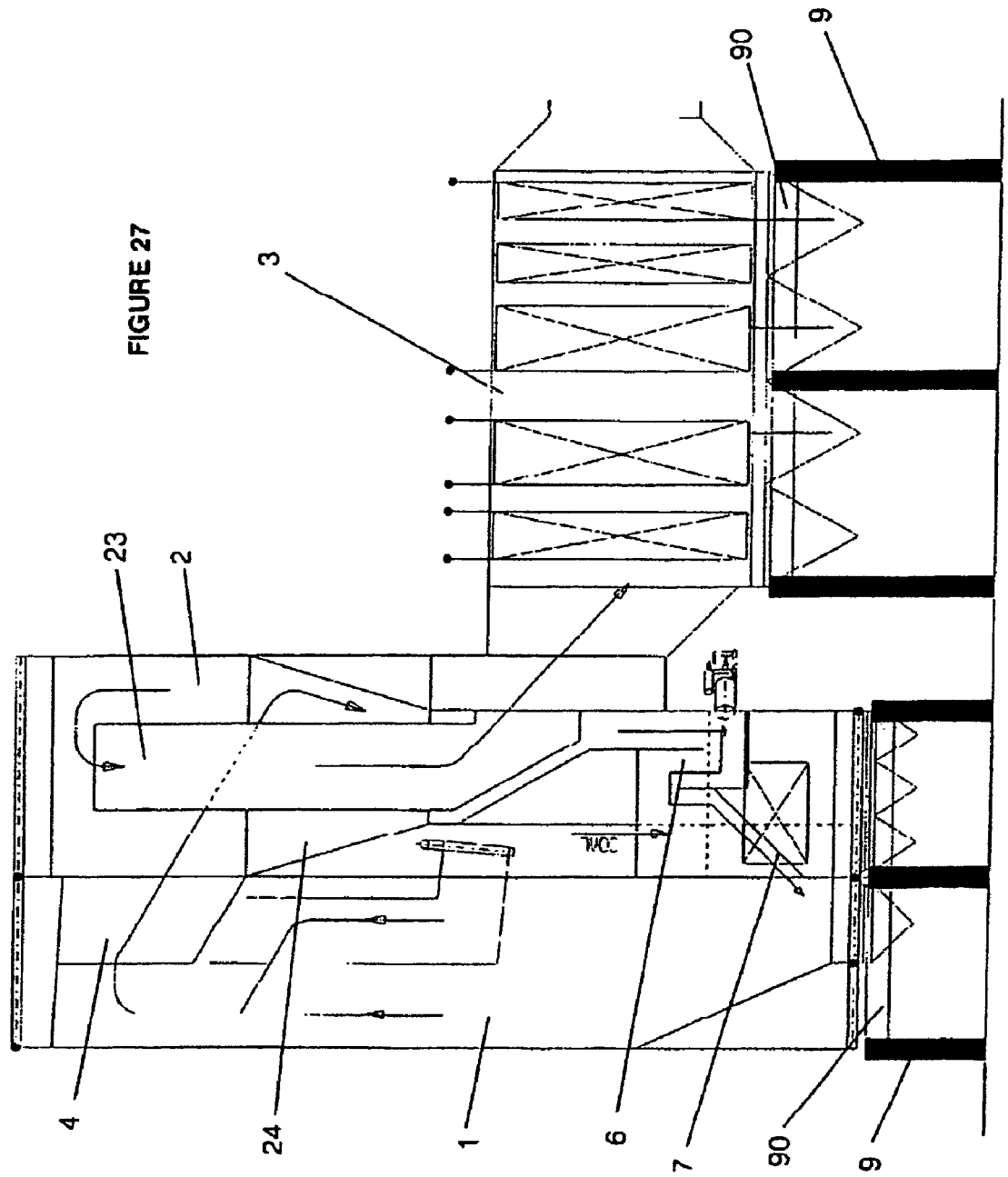

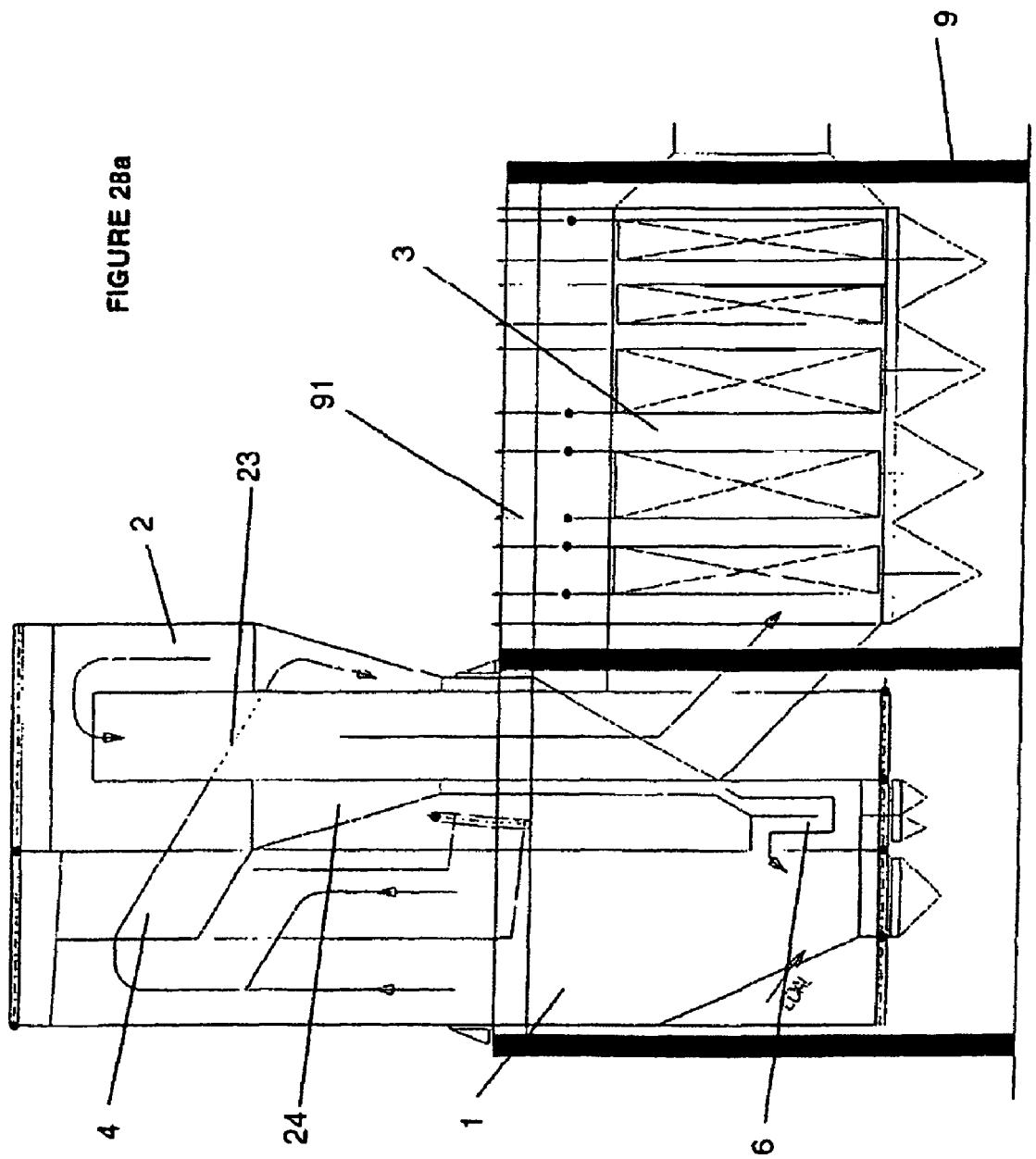

CIRCULATING FLUIDIZED BED REACTOR WITH SEPARATOR AND INTEGRATED ACCELERATION DUCT

FIELD OF THE INVENTION

The present invention relates to circulating fluidized bed reactors for reacting solids and gases and producing energy and to boilers.

BACKGROUND ART

These reactors comprise a reaction chamber in which gases and solids react, a centrifugal separator, and one or more heat exchangers for adjusting the temperature of the reaction chamber.

Boilers comprise a combustion chamber in which fuel is burned, a centrifugal separator, and one or more heat exchangers for adjusting the temperature of the reaction chamber.

For simplicity, the prior art described in relation to the present application covers only circulating fluidized bed boilers.

The fuel circulates in a fluidized bed consisting of particles in suspension in air. Fluidization entrains the particles toward the top of the combustion chamber or the reaction chamber, from which they are evacuated to a circular section centrifugal separator which separates the particles from the flue gases. The speed of the flue gases is from 3 m/s to 6.5 m/s in the combustion chamber and from 4 m/s to 6.5 m/s on the axis of the separator. The solid particle content of the flue gases can be as high as 20 kg/Nm$^3$ and the particle size of the circulating particles is less than 500μ.

The centrifugal separator comprises a vertical vortex chamber which has vertical walls, one or more inlet orifices in the upper portion of the separator which receive flue gases to be purified, one or more evacuation orifices for purified flue gases, and one or more evacuation orifices for separated particles in the lower portion of the separator and connected to the bottom of the combustion chamber. The evacuation orifice for purified flue gases is in the upper portion of the separator, i.e. above the area in which the particles are separated.

The walls of the separator converge toward the bottom in order to channel the captured particles toward the lower evacuation orifice. This lower portion is of conical shape, as appropriate to the shape of the separator.

Some of the captured particles are cooled by passing them through a parallel cooling circuit and fed back into the bottom of the combustion chamber or the reaction chamber, where they begin a new cycle in order to maintain a fluidized bed in the combustion chamber or the reaction chamber, and the remaining particles are fed back directly into the bottom of the combustion chamber or the reaction chamber. This circuit constitutes the reaction chamber solids loop.

To reduce the amount of SO$_2$ emitted, limestone particles are introduced into the circulating fluidized bed. However, these particles are only partly sulfated on each pass through the combustion chamber or the reaction chamber. It is therefore necessary to ensure that they remain in the circulating fluidized bed for as long as possible.

The flue gases are evacuated to the atmosphere after passing through a series of heat exchangers in a cage to the rear of the boiler, in which they are cooled.

The temperature of the combustion chamber or the reaction chamber can be controlled by fluidized bed exchangers situated in tubed or untubed exterior beds and which can be contiguous with the bottom of the combustion chamber or the reaction chamber. The exchangers situated in the combustion chamber or the reaction chamber are L-shaped or U-shaped exchangers and/or omega tube panels.

The particles that circulate in the reaction chamber solids loop cause serious erosion of the walls of some parts of the circuit, such as the bottom of the combustion chamber or the reaction chamber, the separator, the inlet duct and the solids return duct, which makes it necessary to cover the walls with a thick refractory material. This leads to a significant increase in the manufacturing cost of the boiler and a significant increase in the suspended weight. The increase in the suspended weight makes it essential to provide reinforced frameworks to support these components. The refractory materials have a high thermal inertia which increases the time to warm up the boiler and cool it down on starting and stopping it.

It is also possible to make some walls of the separator from parallel tubes joined together by fins, the tubes carry a heat-exchange fluid such as water and/or steam and thus constitute cooling surfaces. The walls cooled in this way reduce the thickness of the refractory material layer needed. However, producing these walls for a circular geometry separator is complex and costly. In fact, circulating water in the walls necessitates a multitude of feeder and evacuation tubes and connectors.

Moreover, the arrangement of the reaction chamber solids loop with independent elements interconnected by ducts in which solids or gases circulate leads to a high weight and bulk.

Attempts have therefore been made to optimize this type of installation by using plane walls for a distinctly non-circular section centrifugal separator, as in the patents EP 481 438 and EP 730 910. This solution enables the use of a thin refractory material layer on the wall of the separator and therefore reduces its weight. This solution also creates a module that can be reproduced if the power of the installation is to be increased. However, this type of solution is not satisfactory because the flue gases enter the centrifugal separator via an orifice that does not enable sufficient acceleration of the particles and the gases contained in said flue gases. Their speed being insufficient, the particles are difficult to separate in the separator. This leads to loss of particles from the bed in the flue gases evacuated via the outlet of the separator. This is highly unfavorable from the point of view of heat transfer in the combustion chamber, the rate of sulfation of the fine limestone particles in the combustion chamber, and the oxidation of the fine carbon particles in the combustion chamber or the reaction chamber. The fine particles are discharged into the atmosphere before virtually total sulfation or oxidation.

It was then proposed, as in the applicant's application EP 01 402 809.6, to use the walls of the rear cage as common cooling walls for the combustion chamber or the reaction chamber, on the one hand, and the centrifugal separator, on the other hand, in order to be able to place an acceleration duct between the combustion chamber or the reaction chamber and the separator. This assembly constitutes a basic module. The acceleration duct accelerates the flue gases from 15-20 m/s at the duct inlet to 25-35 m/s at the duct outlet, so that the solid particles can be accelerated in order to separate them better centrifugally and to cause preseparation of the particles contained in the flue gases on the walls of the duct. Another fundamental feature is the pyramidal shape of the lower portion of the separator, this truncated pyramid shape preventing rebounding of the vortex flow of flue gases on one of the walls of the lower portion. However, this configuration of the basic module makes it obligatory to place the combustion chamber (or the reaction chamber), the separator and the rear cage at right angles, the separator having a common wall with the rear cage. If it is required to increase the power of the installation, it is necessary to increase the number of separators, and this form of the basic module rules out simple production of assemblies comprising odd numbers of separators, starting from three separators.

SUMMARY OF THE INVENTION

The present invention is both simple and economic, while retaining a modular structure regardless of the number of separators required, and allowing excellent separation of particles in the separator; it provides for easy increases of capacity, a maximum increase in the common wall areas, a reduction in terms of the quantities of refractories used, the number of expansion joints, the overall weight and size, and the strength of the frameworks, while improving the warming up and cooling down times and the flow of particles in the circuit, and reducing maintenance. It also provides for preseparation of particles in the top of the reaction chamber. The invention simultaneously secures excellent separation performance of the separator and thus an improved rate of internal recirculation of fine particles, whence an increase in the particle residence time, a reduction in unreacted reagents and, for boilers, an increase in the rate of sulfation of the limestone introduced, which reduces the quantity of limestone that has to be introduced. Increased internal recirculation of particles also increases the exchange coefficients in the upper part of the reaction chamber, and the high concentration of fine particles circulating in the bed makes it less erosive. The fraction of fly ash escaping from the separator is reduced, which reduces erosion, fouling and secondary emissions of CO by the heat exchangers in the rear cage downstream of the separator.

The present invention relates to a circulating fluidized bed reactor comprising a reaction chamber connected by an acceleration duct to a centrifugal separator for separating particles from hot gases coming from said reaction chamber, characterized in that at least part of the acceleration duct is inside the top of the reaction chamber and the centrifugal separator has substantially straight vertical walls. Placing the acceleration duct in the reaction chamber allows centrifugal horizontal flow of the flue gases at the top of the chamber, which changes the speed of the particles from approximately 6 m/s in the vertical direction to approximately 16 m/s in the horizontal direction. This solution reduces the distance between the reaction chamber and the separator while enabling the use of: an acceleration duct that improves the separation performance of the separator. It also allows the tubes of the reaction chamber to be used as walls of the duct, both on the exterior side, which is also known as the extrados, and on the ceiling. The reaction chamber also supports the duct. This configuration is very compact since the duct is partly integrated into the reaction chamber. The conventional separator of circular section is replaced by a separator of polygonal section, especially square or rectangular.

According to one particular feature of the invention, all of the acceleration duct is inside the top of the reaction chamber. To minimize the distance between the chamber and the separator, it is sufficient to integrate all of the acceleration duct into the reaction chamber.

In a first variant of the invention, the acceleration duct has an inlet mouth substantially perpendicular to the extrados of the duct. The duct is divided into two portions, namely a front portion and a rear portion, which are aligned with each other. In this case, the floor of the duct represents only a fraction of the width of the wall of the reaction chamber parallel to the extrados of the duct, which can constitute said extrados.

In a second variant of the invention, the acceleration duct has an inlet mouth substantially parallel to the extrados of the duct. The two portions of the duct are at an angle to each other. This configuration is easier to construct. The floor of the duct represents the whole of the width of the wall of the reaction chamber parallel to the extrados of the duct, which can constitute said extrados.

According to another feature, the centrifugal separator and the reaction chamber have a common wall disposed therebetween. The common wall has opposing sides, whereby one side provides at least a portion of the reaction chamber and the other opposing side provides at least a portion of the separator. Because the walls of the separator are straight, like those of the reaction chamber, they can be contiguous. Consequently, a wall of the separator and a wall of the reaction chamber, which are opposing and disposed between the separator and the reaction chamber, can be contiguous. This common wall can be a single wall or a double wall.

According to one particular feature of the invention, the centrifugal separator and the rear cage have a common wall. To reduce further the fabrication costs of the reactor, the two walls are combined into one. The connections between the outlets of the separator and the rear cage are conventional tubed or untubed connections. The extremely compact configuration minimizes the length of the connecting ducts, or even makes it possible to use only a simple connecting plenum chamber. In this context, the expression "plenum chamber" refers to the extension of the walls of the separator and of the rear cage which then constitute an upward extension of said members and which serve as ducts via an opening in the common wall.

In one variant of the invention, the reaction chamber and the rear cage have a common wall. In this right-angle configuration, the reaction chamber is placed between the separator and the rear cage.

This disposition of the various components makes the reactor more compact, which makes it easier to produce pressurized reactors where necessary. The ratio between the insulated walls and the walls that are close together, i.e. the walls with a distance between them less than 15% of the greatest dimension of the horizontal section of the reaction chamber, is maximized.

According to another particular feature, the combination of the reaction chamber, the separator and the rear cage constitutes a basic module, either aligned or at right-angles, depending on the variant adopted. This kind of module can provide a maximum boiler power of 100 MWe.

Thus in the aligned variant, with a 100 MWe basic module, boilers rated from 100 MWe to 500 MWe, for example, can be obtained by joining together modules and from 200 MWe to 1000 MWe can be obtained by doubling the number of modules in a manner that is symmetrical with respect to the first module.

For example, in the right-angle variant and for a 100 MWe basic module, the basic module is doubled up symmetrically with respect to the reaction chamber/rear cage plane, after which the new subassembly is juxtaposed multiple times if boilers rated from 100 MWe to 1000 MWe are required.

For configurations with symmetrical separators on either side of the reaction chamber, the resulting assembly can be simplified by providing only one rear cage disposed on one side and connected to the outlets of the separators on the other side in a conventional way by tubed or untubed connecting ducts, which can be above the reaction chamber or otherwise. If the connecting ducts were situated above the reaction chamber, they would constitute an extension of the reaction chamber. The ceiling of the reaction chamber can therefore form the floor of the connecting ducts and the vertical walls of the ducts are then continuous with the vertical walls of the reaction chamber and support the weight of those walls.

According to one particular feature the reaction chamber and the separator have aligned exterior walls. Thus the outside of the module or the symmetrical and/or juxtaposed set of basic modules has plane exterior lateral walls which are therefore aligned on the reaction chamber and separator side.

According to another feature, the power of the reactor is a function of the number of modules used. To obtain a particular power, it suffices to multiply the number of modules by the coefficient obtained on dividing the required power by the power of the basic module. In these modules it is possible to group together the reaction chamber portions of each of these modules to constitute a single reaction chamber. In the same way, the rear cage portions of each module can be grouped together to form a single cage.

According to one particular feature, two adjacent modules have a common wall. This particular configuration of the basic module makes the reactor easy to construct; in fact, as its sides are straight, two or more basic modules can easily be juxtaposed.

According to another feature, the wall common to two modules and between two separators is a partial wall. This wall can be cut out totally or in part, either vertically or horizontally, or incorporate orifices. The two separators of the adjacent basic modules have a wall which starts from the upper portion of the separator and stops at a distance from the top and, at the lowest point, in the convergent particle evacuation area of the separator. This wall is straight with no downward convergence, and is therefore simpler and thus easier to construct. To balance internal pressures between adjacent separators (because of a blocked evacuation orifice, for example), it may be necessary for the common wall to include openings or even for there to be no wall at all.

According to another feature, the reaction chambers of two adjacent modules are combined. There is only one reaction chamber regardless of the number of basic modules used, but its size is defined by the number of modules used.

According to another particular feature, the rear cages of two adjacent modules are combined. There is only one rear cage regardless of the number of modules used, and its size can therefore be smaller than that defined by the number of modules used. If the modules are symmetrically disposed with respect to the reaction chamber, a single rear cage is provided on one side and the connecting ducts then pass over the chamber.

According to one feature of the invention, one wall of the reaction chamber includes an inlet deflector of the acceleration duct. To facilitate entry of the particles and the flue gases into the duct, a deflector is disposed appropriately.

According to one particular feature, the walls are tubed. The fact that they are straight facilitates their production and therefore reduces their cost. Thus the walls of the acceleration duct, the separator, including the lower portion, and the reaction chamber are tubed.

According to another feature, the walls of the acceleration duct and the separator and the bottom wall and the top wall of the reaction chamber are covered with a layer of refractory material. The temperature and the erosive properties of the particles circulating in the various components necessitate the use of a layer of refractory material, which can be thinner when the walls are cooled, which reduces weight, since these materials are relatively heavy. The refractory layer is therefore much thinner on the walls of the acceleration duct and the separator and on the top and bottom walls of the reaction chamber in the area of the duct than in the conventional untubed solution.

According to one particular feature, the walls of the portion of the acceleration duct inside the top of the reaction chamber consist of tubes from the walls of the reaction chamber. In this case the tubes branching from the walls of the reaction chamber are continuous with the cooling water/steam circuits of those walls. For example, some of the tubes of one of the walls of the reaction chamber are diverted toward the interior of the reaction chamber in order to form firstly the floor of the duct and then to be continuous with the vertical wall in the reaction chamber, i.e. the intrados of the duct. The extrados of the duct is formed by the remaining non-diverted tubes of the reaction chamber wall. The ceiling of the duct can be formed by the ceiling of the reaction chamber. If the floor of the duct needs to be reinforced, two or more rows of tubes can be used. Diverted tubes form firstly a first row and then a second row superposed on and connected to the first in order to impart sufficient inertia to the floor and to return them to their place in the wall of the reaction chamber. The tube thus performs a round trip under the floor of the duct. The tubes used to form the walls of the duct can be either those of the outer jacket of the reaction chamber or internal separator walls of the reaction chamber. Thus the reaction chamber supports the acceleration duct.

According to another feature, the walls of the portion of the acceleration duct inside the reaction chamber use tubes from the walls of the separator. The duct in the reaction chamber can therefore consist of tubes from the chamber and/or tubes from the separator.

In one variant of the invention, the walls of the acceleration duct comprise tubes forming a separate circuit. The tubes of the duct are independent of those of the walls of the reaction chamber and the walls of the separator.

According to another particular feature, the walls of the duct are produced using tubes from the walls of the reaction chamber and the separator. Part of the wall is made up of tubes coming from the reaction chamber and the other part of those coming from the separator, in any relative proportions, which optimizes both circuits.

According to another feature, the deflector consists of tubes diverted from the walls of the reaction chamber. The corner of the reaction chamber in which the deflector is placed is rounded or beveled to constitute a deflector and the tubes constituting the walls of the reaction chamber are diverted to constitute said deflector.

According to another feature, a deflector is formed by rounding the tubes of the floor of the duct. In this way, the tubes of the floor of the duct and diverted from the walls of the reaction chamber and/or the separator and/or a separate circuit can be rounded or beveled under said floor and thereby constitute the deflector.

According to another feature, the floor of the duct is inclined toward the separator. The floor has a slope directed toward the separator in order to guide the particles that are deposited toward the separator.

According to another feature, the floor of the duct is inclined toward the extrados of the duct. To encourage separation of the particles the floor is inclined toward the extrados of the duct, i.e. on a wall which is aligned with the solids capturing face in the separator.

According to one particular feature, the section of the exterior and interior walls of the duct changes more than once. These changes of section optimize the speed of the particles.

The temperature in the reaction chamber can be controlled by fluidized bed heat exchangers situated in tubed or untubed exterior tubes and which may be contiguous with the bottom of the reaction chamber. The heat exchangers in the reaction chamber are L-shaped and/or U-shaped exchangers and/or omega panels.

In one particular variant of the invention, the evacuation of the gases from the centrifugal separator is effected via a vertical duct situated inside said separator and which directs the gases toward the bottom of the separator. The duct can be covered with refractory both on the inside and on the outside. The duct can be tubed or not. The gases exiting at the bottom, the duct does not pass over the separator, which means that the assembly may be of reduced height and said rear cage may be placed on the ground. This construction reduces the number of exchanger manifolds and the lengths of the associated pipeworks.

According to another feature of the particular variant, the duct is placed in the middle of the separator. The central position improves the circulation of particles and flue gases. The space taken up in the section of the separator must be compensated by increasing the horizontal section of the separator so that the space left for the circulation of particles is identical to that in the solution in which the gases are evacuated at the top in the conventional way. If a limitation is imposed by the size of the reaction chamber, then the section must be enlarged at the rear by using a rectangular section.

According to a supplementary feature, a deflector is placed at the top of the separator. This deflector directs the gases toward the central gas evacuation duct and is positioned substantially in alignment with the evacuation duct.

According to a complementary feature, the deflector has a section at least equal to that of the flue gas evacuation duct, its position is substantially aligned with that of the evacuation duct, and its height is less than that of the constant section portion of the separator. This facilitates the passage of the gases toward the evacuation duct.

According to another feature, the separator is carried by at least one of the evacuation ducts of the separator. The vertical duct for evacuation of the flue gases rises at least as far as the conical portion of the separator and goes down as far as the rear cage if the latter is sufficiently low. The duct may serve as a base for the separator. The duct for evacuating particles from the separator descends sufficiently to serve as a support for the separator and, since the rear cage is no longer suspended from said separator, the weight thereof is greatly reduced.

According to another feature, the rear cage is horizontal. Because the separator is self-supporting and the flue gases are evacuated from the bottom, the rear cage no longer needs to be higher than the separator and can therefore be placed horizontally and low down. This construction allows fractional recovery of heavy metals contained in the ash. This is because heavy metals progressively condense on the ash contained in the flue gases as the flue gases cool. The condensation temperature is specific to each type of metal. It is therefore possible, under a horizontal boiler comprising a plurality of hoppers, to extract from under the suspended equipment ash more or less charged with heavy metals, which may be an advantage for their subsequent valorization.

According to another feature, the rear cage is situated under the separator. To make the assembly more compact, it is possible to place the rear cage under the separator, which is then supported by said rear cage.

In another disposition, the rear cage is placed on concrete slabs. Because the gases are evacuated from the separator at the bottom and it is possible for the rear cage to be positioned low down, it is possible to place it on a support slab directly on the ground. The metallic framework that usually supports these assemblies may then be dispensed with, representing a significant saving in cost and reduction in weight of the assembly. This also has the benefit of shortening the connecting pipeworks between the rear cage and the turbine, leading to further cost reduction. The assembly is then supported by a concrete slab or by a metallic support structure directly on the ground. It is also possible to suspend the assembly at mid-height, which has the advantage of limiting the use of the friction shoes that are necessary for the solution with the assembly placed on the ground, at the same time as minimizing the metallic framework. There is therefore a wider range of choices, enabling a response to more constraints imposed by clients and therefore the offer of the most suitable solution.

In another variant, a secondary separator is placed between the main separator and the rear cage. This separator can be round, polygonal or square. This secondary separator captures more of the dust contained in the flue gases in order to be able to re-inject them into the hearth and increase their conversion (i.e. to reduce unburned solids and the consumption of limestone), as well as reducing the erosive charge in the recovery boiler.

BRIEF DESCRIPTION OF THE DRAWINGS

The invention will be better understood after reading the following description of a boiler, which is one particular type of reactor, which description is given by way of example only and with reference to the accompanying drawings, in which:

FIG. 12a is a view of the duct from FIG. 12 in the direction A, FIG. 12b is a plan view of the duct from FIG. 12, FIG. 13a is a view of the duct from FIG. 13 in the direction A, FIG. 13b is a plan view of the duct from FIG. 13, FIG. 14a is a view of the duct from FIG. 14 in the direction A, FIG. 14b is a plan view of the duct from FIG. 14, FIG. 15a is a view of the duct from FIG. 15 in the direction A, FIG. 15b is a plan view of the duct from FIG. 15, FIG. 15c is a view of the duct from FIG. 15 in the direction C, FIG. 16a is a view of the duct from FIG. 16 in the direction A, FIG. 16b is a plan view of the duct from FIG. 16, FIG. 16c is a view of the duct from FIG. 16 in the direction C, FIG. 17a is a view of the duct from FIG. 17 in the direction A, FIG. 17b is a plan view of the duct from FIG. 17, FIG. 17c is a view of the duct from FIG. 17 in the direction C, FIG. 18a is a view of the duct from FIG. 18 in the direction A, FIG. 18b is a plan view of the duct from FIG. 18, FIG. 18c is a view of the duct from FIG. 18 in the direction C, FIG. 20 is a detail view in elevation of the duct with its end portion in the separator, FIG. 20a is a plan view of the duct from FIG. 20, FIG. 21 is a detail view in elevation of the duct with its end portion in the reaction chamber, FIG. 21a is a plan view of the duct from FIG. 21, FIG. 22 is a view in elevation of a boiler or a reactor according to the invention comprising two basic modules according conforming to the first variant.

FIG. 25 is a view in elevation of a boiler or a reactor according to the invention with evacuation of gases at the bottom and exit at the top of the rear cage, FIG. 26 is a view in elevation of a boiler or a reactor according to the invention with evacuation of gases at the bottom and exit at the bottom of the rear cage, FIG. 27 is a view in elevation of a boiler or a reactor according to the invention with evacuation of gases at the bottom and a mid-height horizontal rear cage, FIG. 28a is a view in elevation of a boiler or a reactor according to the invention with evacuation of gases at the bottom and a horizontal rear cage in a bottom position and supported at mid-height of the reactor.

Figure 1:
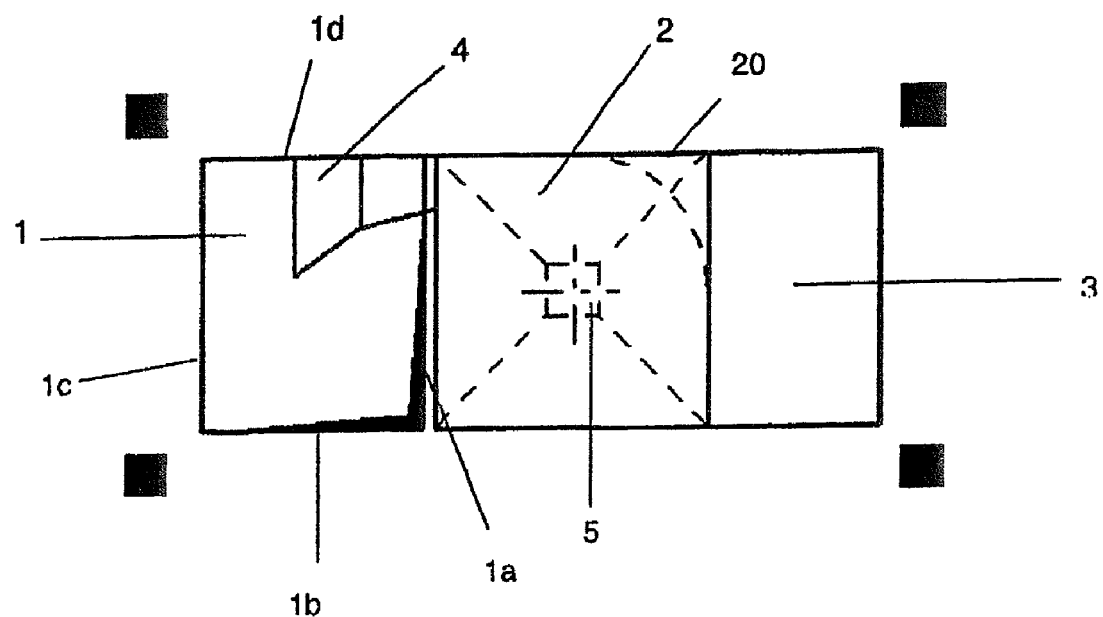
FIG. 1 is a plan view of a first variant of a boiler or reactor according to the invention with a duct having an inlet mouth in the reaction chamber and perpendicular to the extrados of the duct.

The boiler or the reactor according to the invention comprises a reaction chamber 1, a separator 2 and a rear cage 3, as can be seen in FIG. 1. In the first variant (see FIG. 1), these elements are aligned. A duct 4 connects the reaction chamber 1 to a separation chamber of the separator 2.

Figure 23:
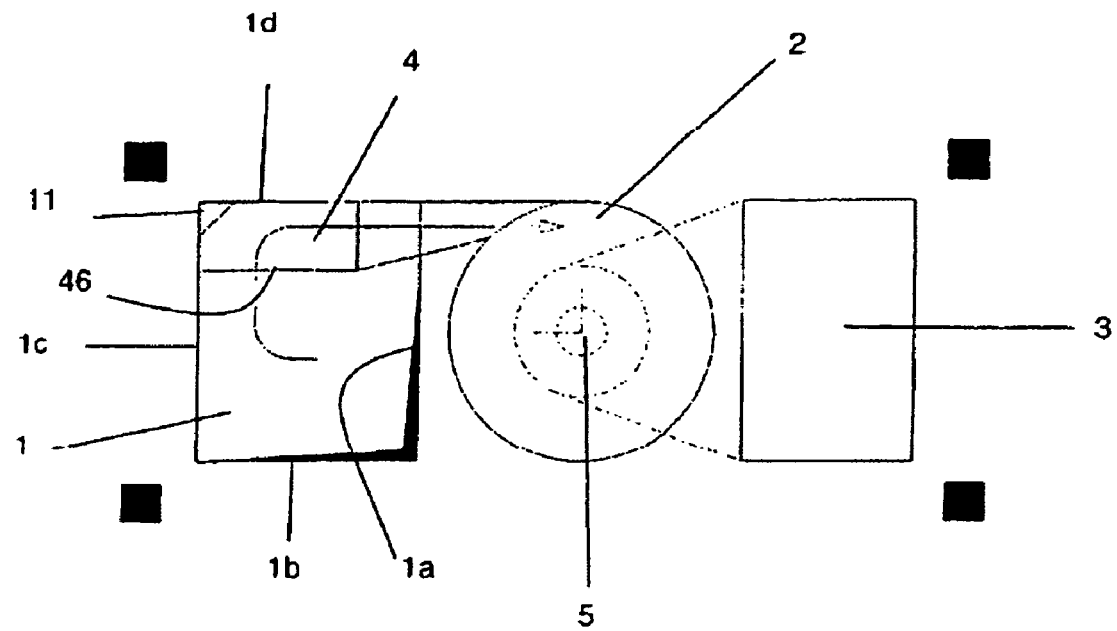
FIG. 23 is a plan view of a boiler or a reactor according to the invention with a circular section separator.
Figure 24:
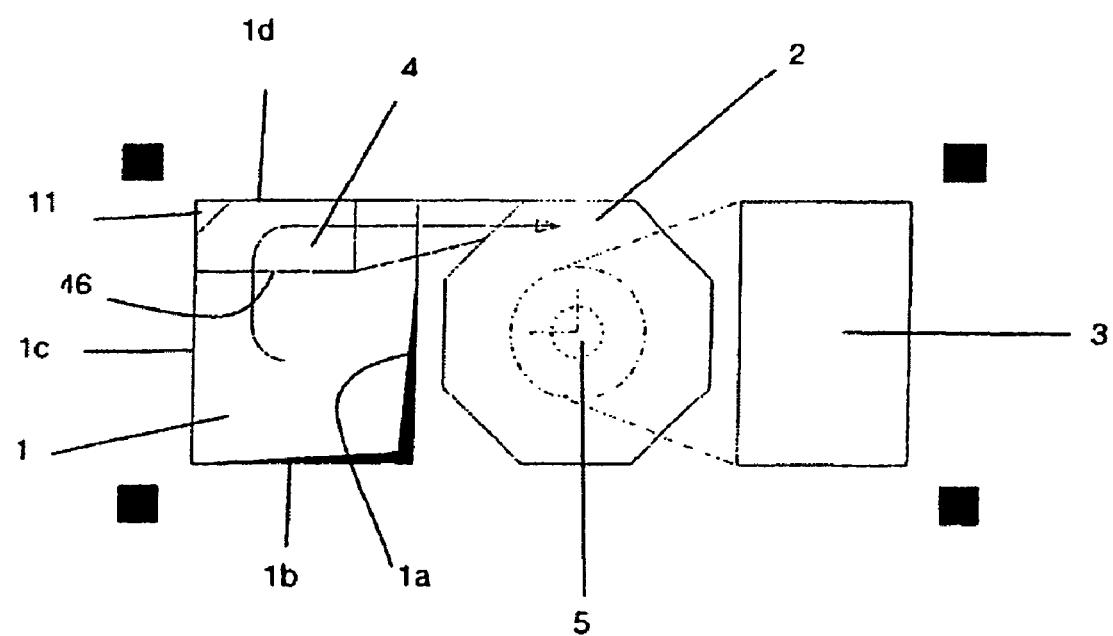
FIG. 24 is a plan view of a boiler or a reactor according to the invention with a polygonal section separator.

The separator 2 includes a particle outlet 5. In different variants, the separation chamber of the separator 2 can be of the conventional round shape (FIG. 23), polygonal shape (FIG. 24), or square shape (FIGS. 1 to 7 and 12 to 21).

As shown in FIG. 1, a rounded deflector 20 is positioned in front of the entry for flue gases into the separator 2.

The gases are evacuated via an orifice 22 in the upper portion of the separator 2 (FIGS. 8 to 11).

Figure 2:
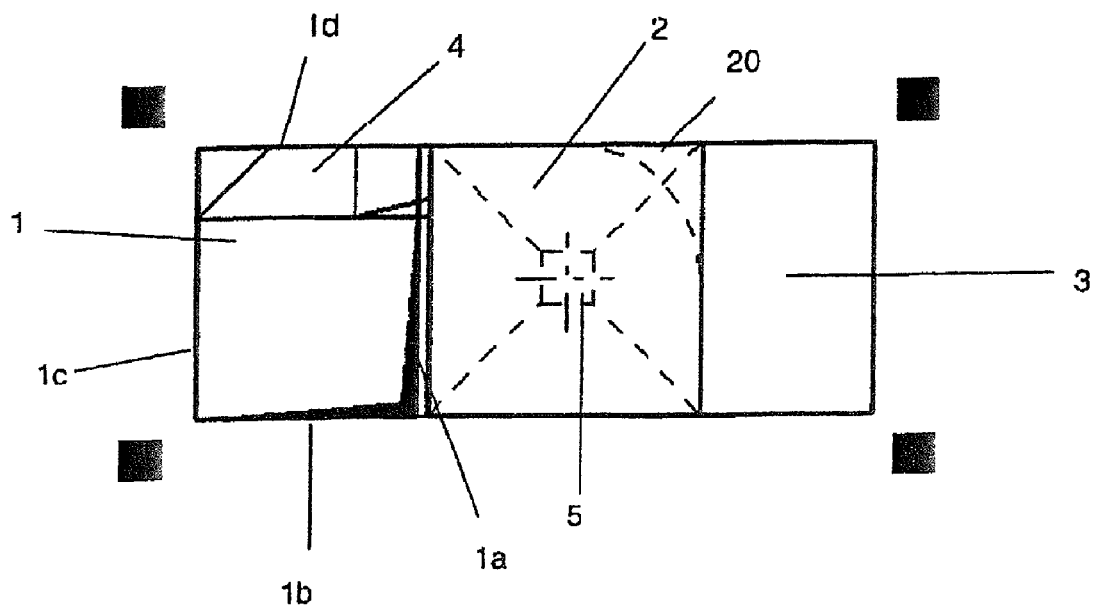
FIG. 2 is a plan view of a boiler or a reactor according to the invention with a duct having a mouth in the combustion chamber and parallel to the extrados of the duct, and a double wall disposed between the reaction chamber and a separator.

The duct 4 in FIG. 1 has an inlet mouth 46 perpendicular to the wall 1d while that in FIG. 2 is parallel to said wall 1d. The inlet of the duct 4 is aligned with the duct 4 in the first case and perpendicular to the axis of the duct 4 in the second.

Figure 3:
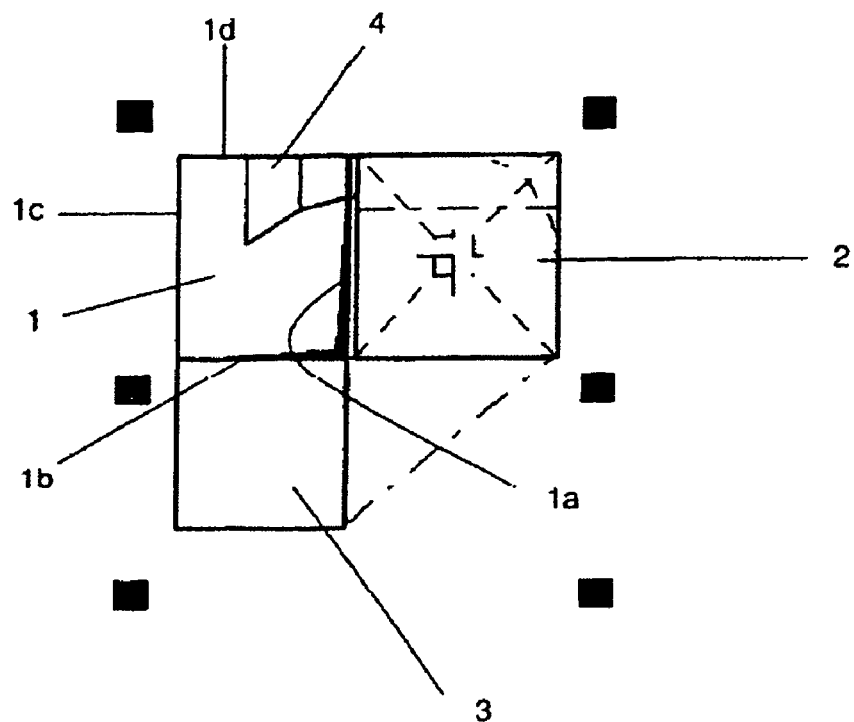
FIG. 3 is a plan view of a second variant of a boiler or a reactor according to the invention.

In the variant of the boiler or the reactor shown in FIG. 3, the separator 2 is on one side 1a of the reaction chamber 1 and the rear cage 3 is on the side 1b adjacent the previous one.

Figure 4:
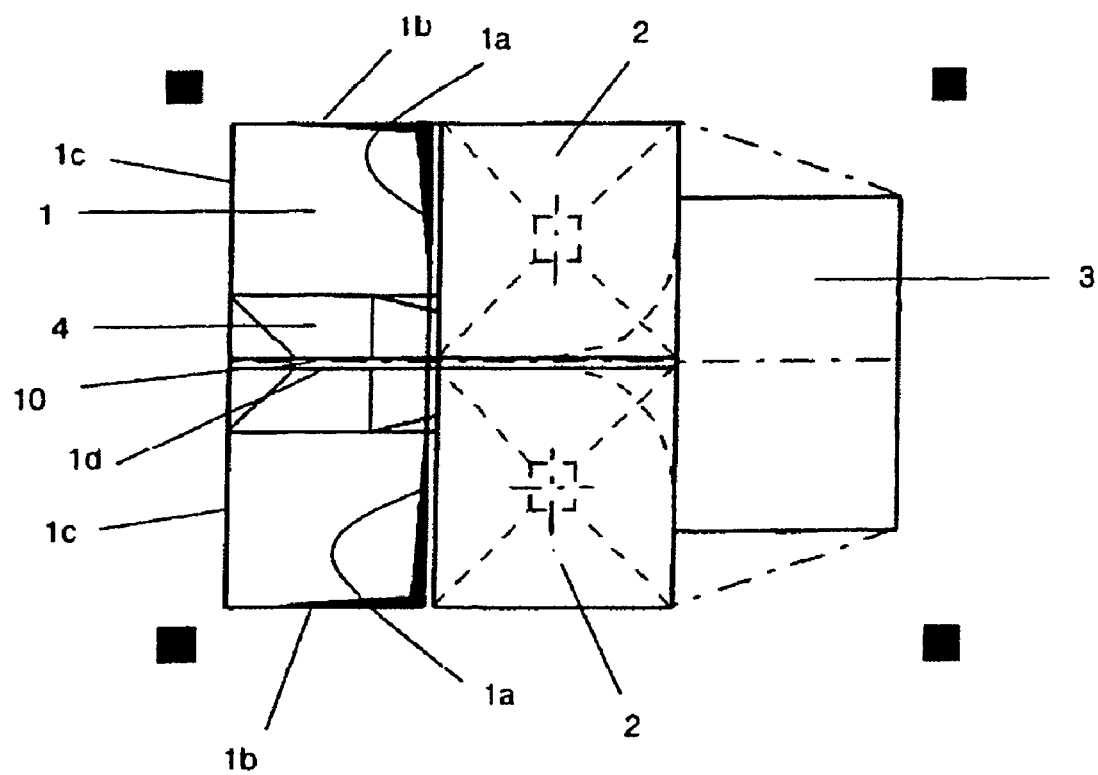
FIG. 4 is a plan view of a boiler or a reactor with two modules of the first variant.

FIG. 4 shows a boiler or a reactor comprising two juxtaposed modules identical to those shown in FIG. 2. The capacity of the boiler or the reactor can be doubled by doubling the FIG. 4 module symmetrically with respect to the reaction chamber.

Figure 5:
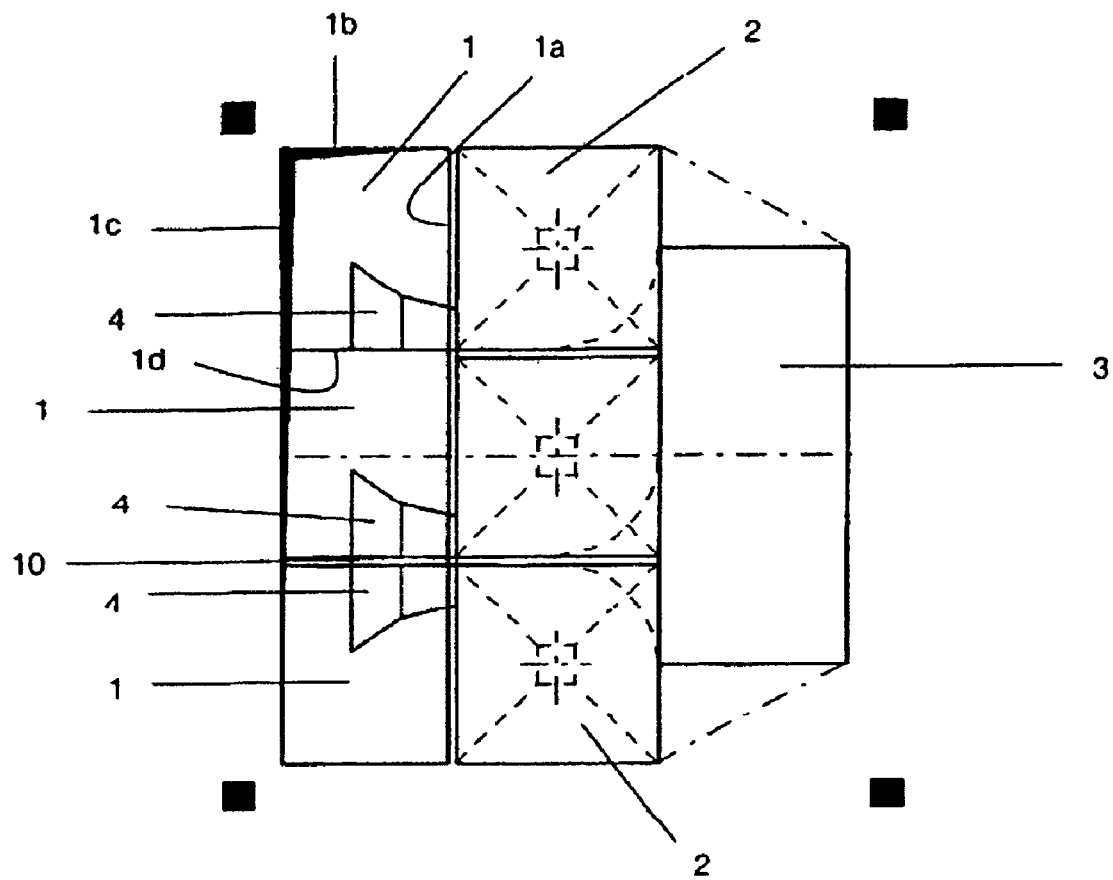
FIG. 5 is a plan view of a boiler or a reactor with three modules conforming to the first variant.

FIG. 5 shows a boiler or a reactor comprising three modules conforming to the first variant aligned side by side. Once again, it is possible to double the capacity of the boiler or the reactor by doubling the modules symmetrically. The reaction chambers 1 of each module can be combined to form a single reaction chamber with a separator 10 in the upper portion only. This separator 10 is tubed and supports the common acceleration duct(s) 4. The rear cage 3 is dimensioned for three separators 2, and its length is less than the sum of the lengths of the three separators 2, as can be seen in FIG. 5.

Figure 6:
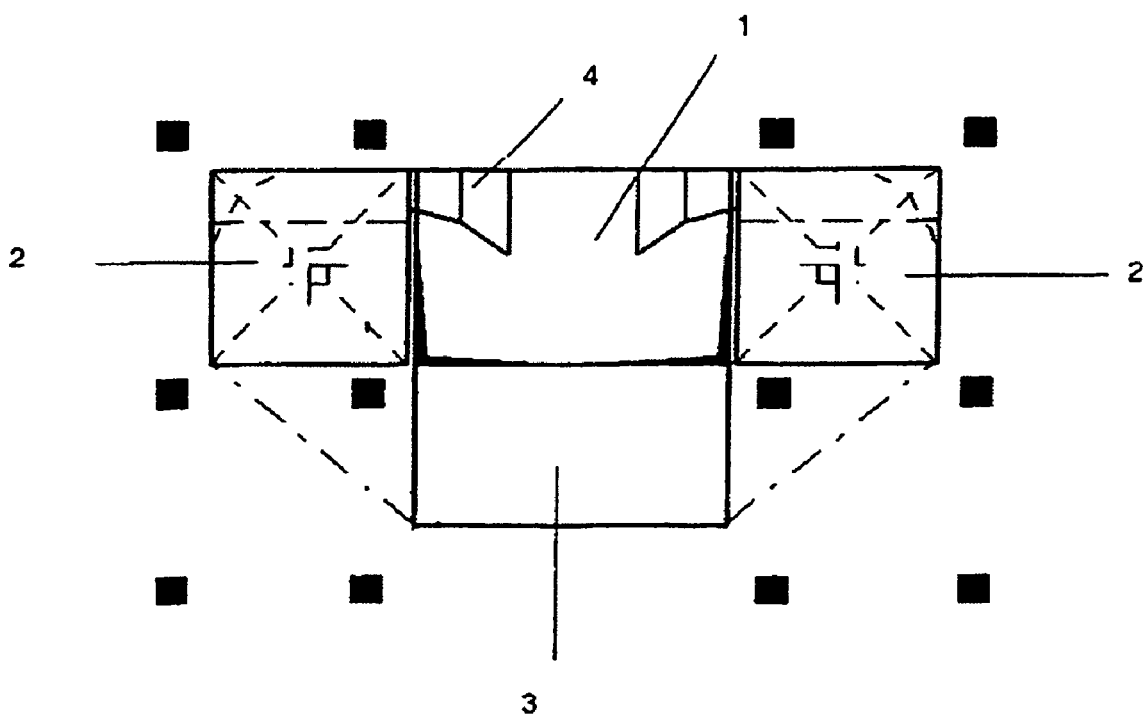
FIG. 6 is a plan view of a boiler or a reactor with two modules conforming to the second variant.
Figure 7:
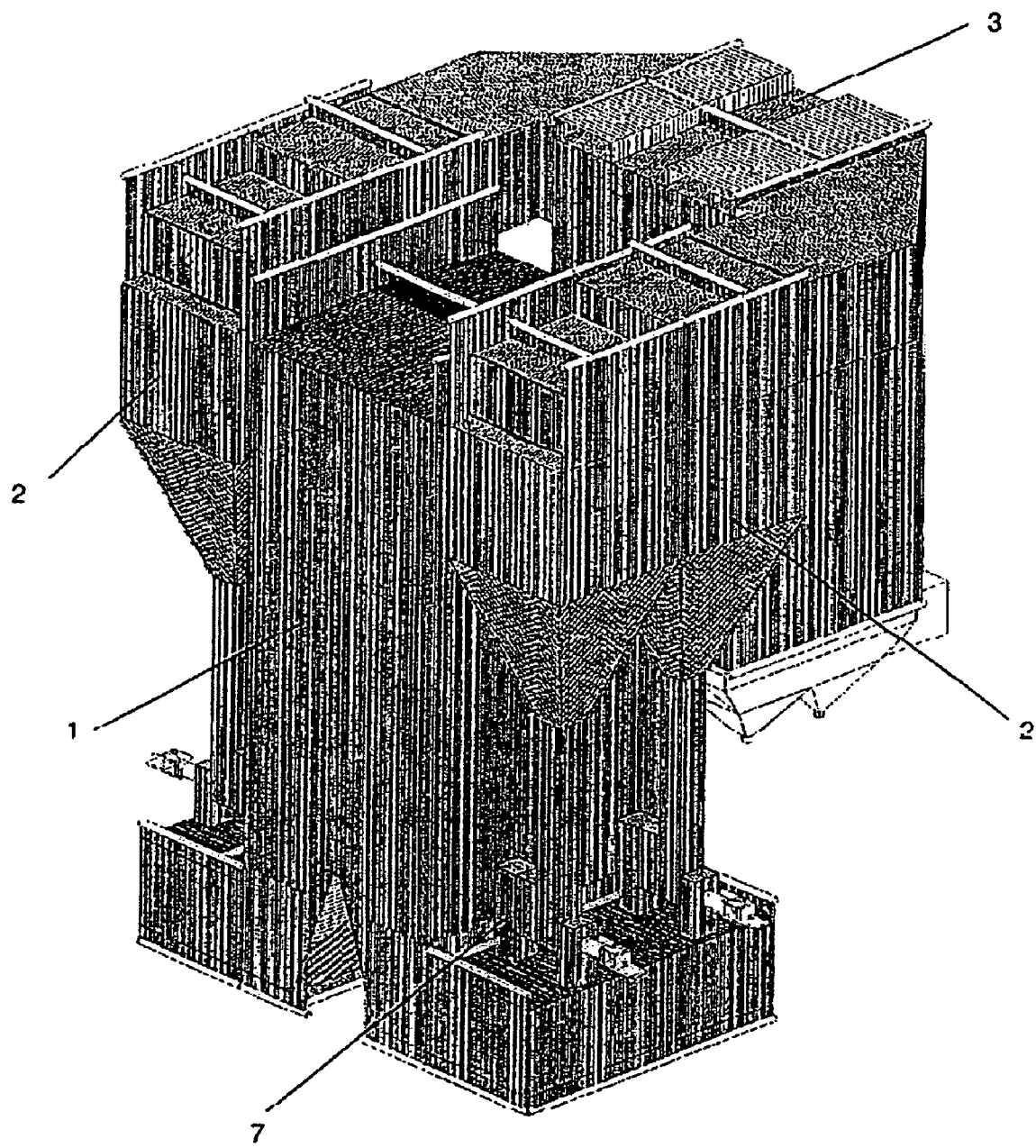
FIG. 7 is a perspective view of the second variant of the boiler or the reactor according to the invention with four separators.

FIG. 6 shows a boiler or a reactor consisting of two modules conforming to the second variant face to face. In this configuration the two reaction chambers 1 of the module are combined to form a single reaction chamber, and likewise the two rear cages 3 of the module.

Regardless of which variant is used, the boiler or the reactor can include siphons 6 and/or exterior beds 7, which are integrated or not and/or contiguous or not to the reaction chamber. This constitutes around five feasible configurations, of which only three are shown.

Figure 8:
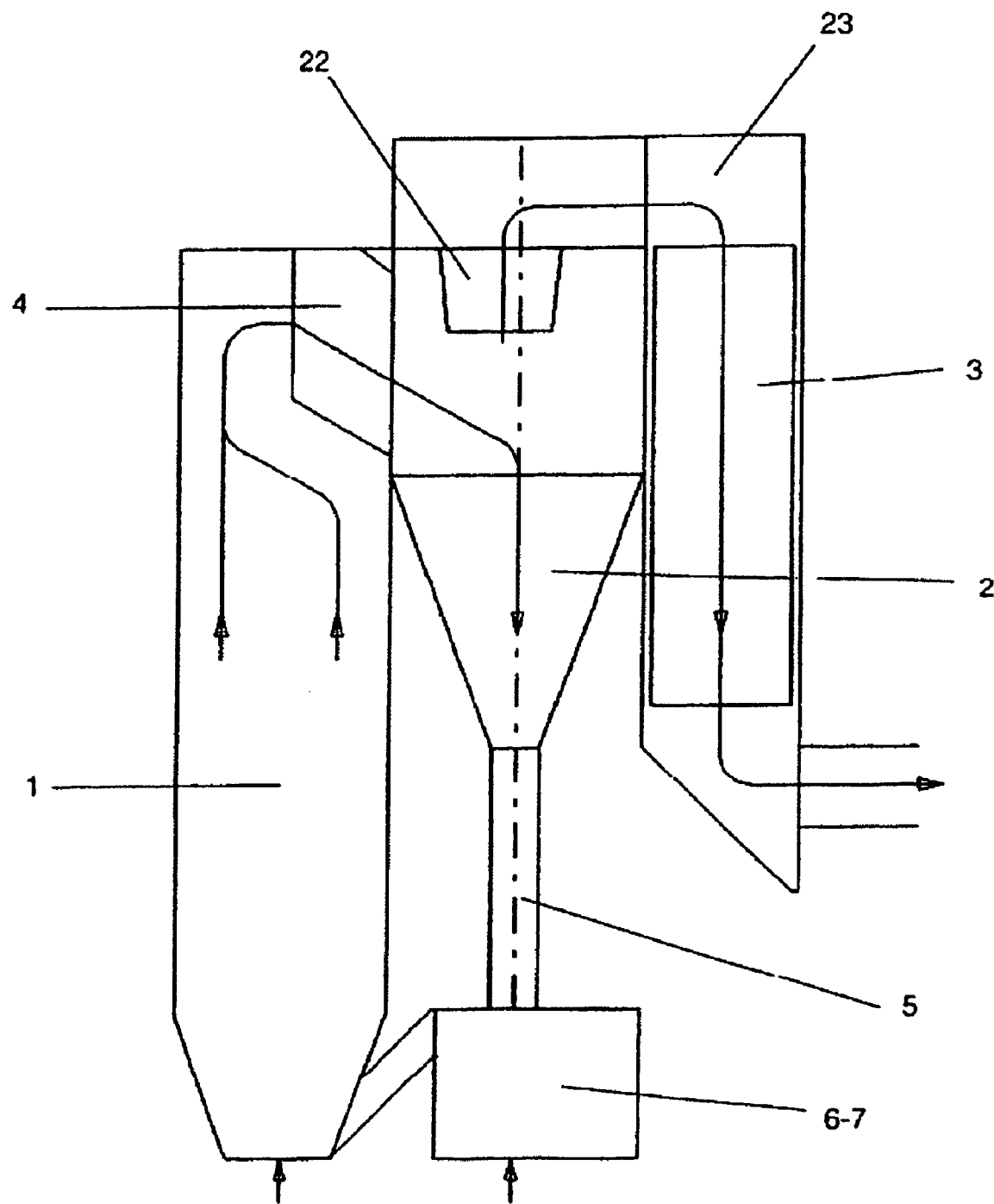
FIG. 8 is an elevation view of the first variant of the boiler or the reactor according to the invention with integrated siphons and beds not contiguous with the reaction chamber.

In a first configuration, shown in FIG. 8, the beds 7 and the siphons 6 are integrated but not contiguous to the reaction chamber 1.

Figure 9:
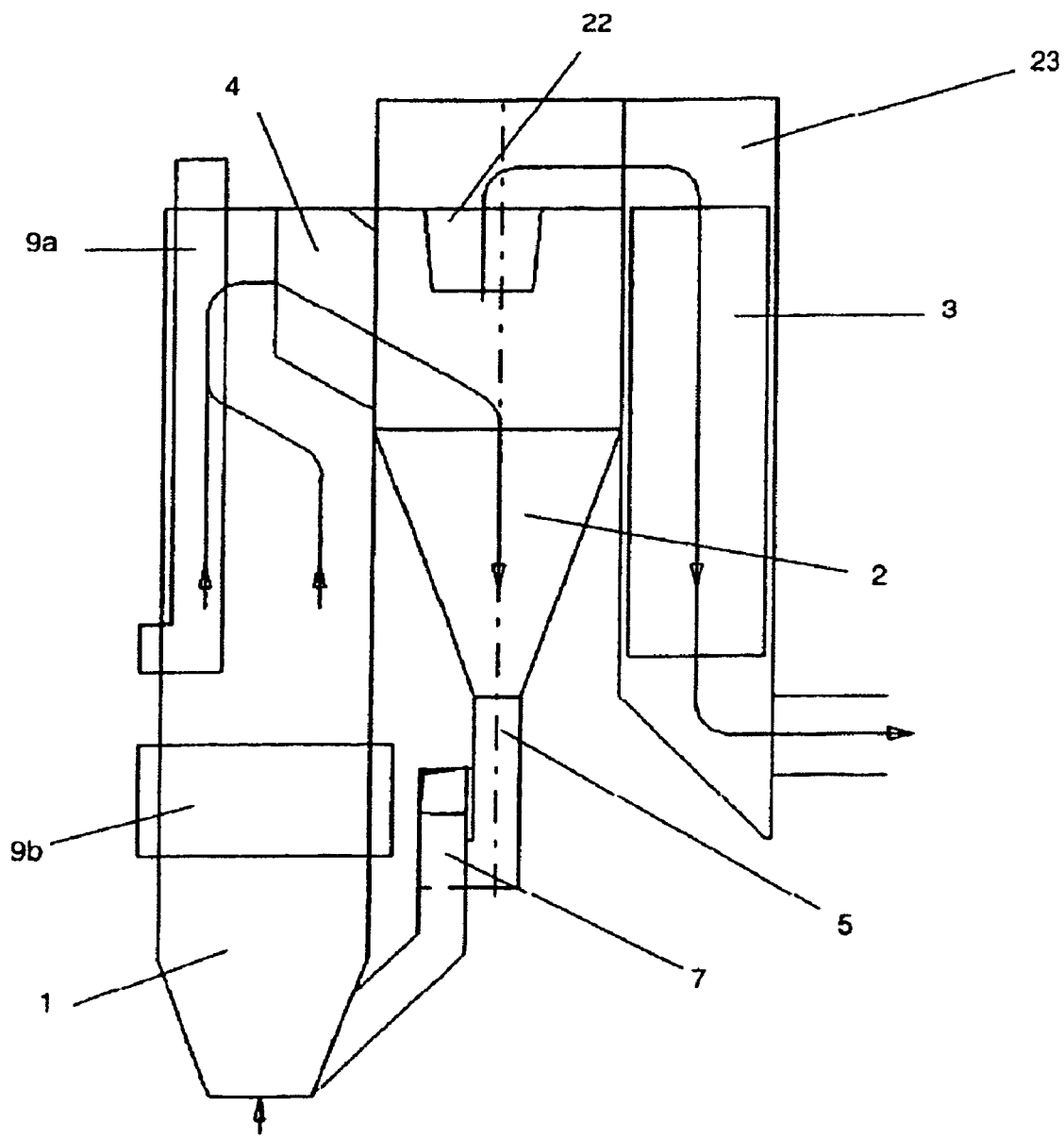
FIG. 9 is a view in elevation of the first variant of the boiler or the reactor with panels in the reaction chamber.

In a second configuration, shown in FIG. 9, the siphon 7 is separate and not contiguous with the reaction chamber 1. Heat exchange panels 9a and 9b are disposed in the reaction chamber 1.

Figure 10:
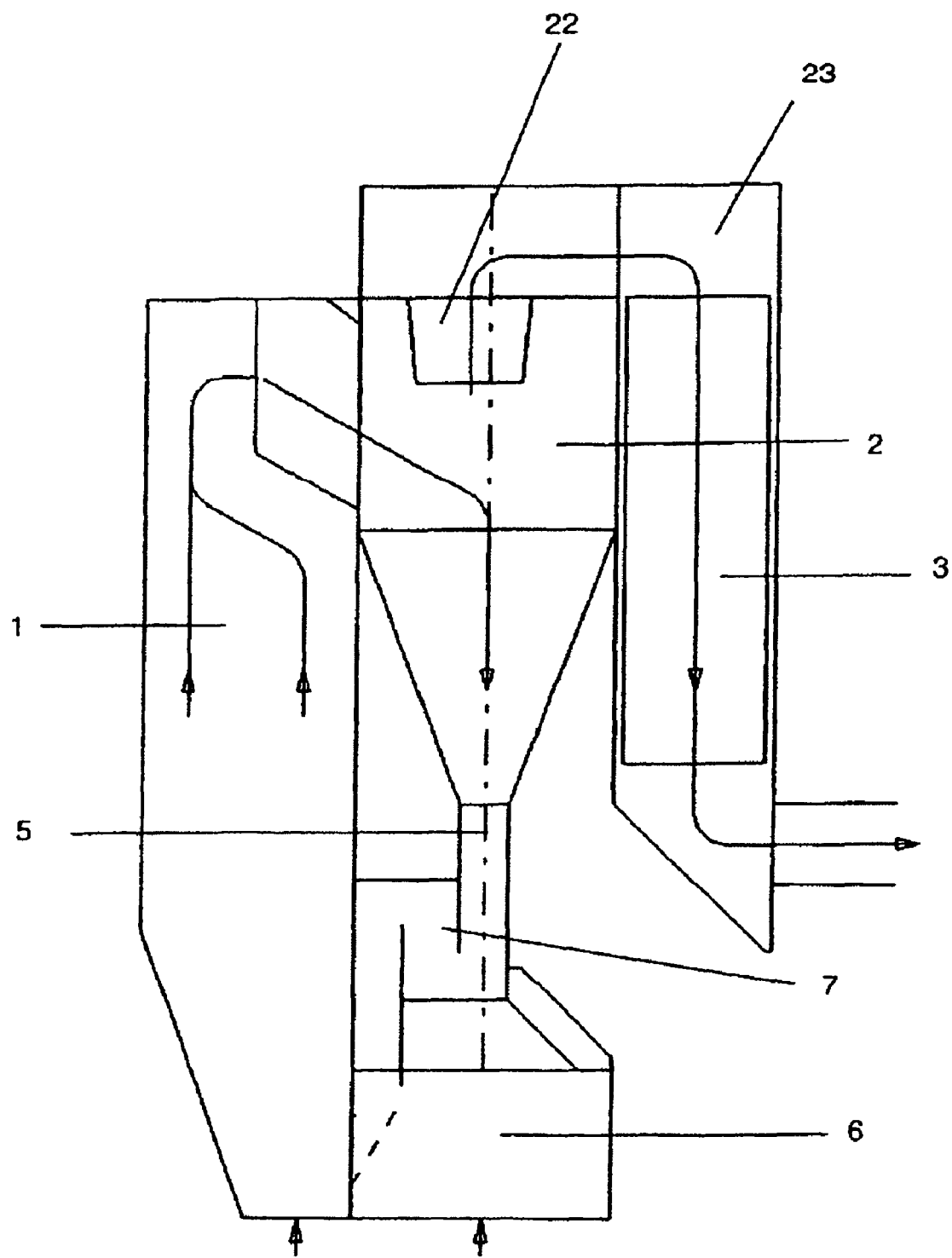
FIG. 10 is a view in elevation of the first variant of the boiler or the reactor with contiguous and separate siphons and beds.

In a third configuration, shown in FIG. 10, the beds 7 and the siphons 6 are separate and contiguous to the reaction chamber 1.

Figure 11:
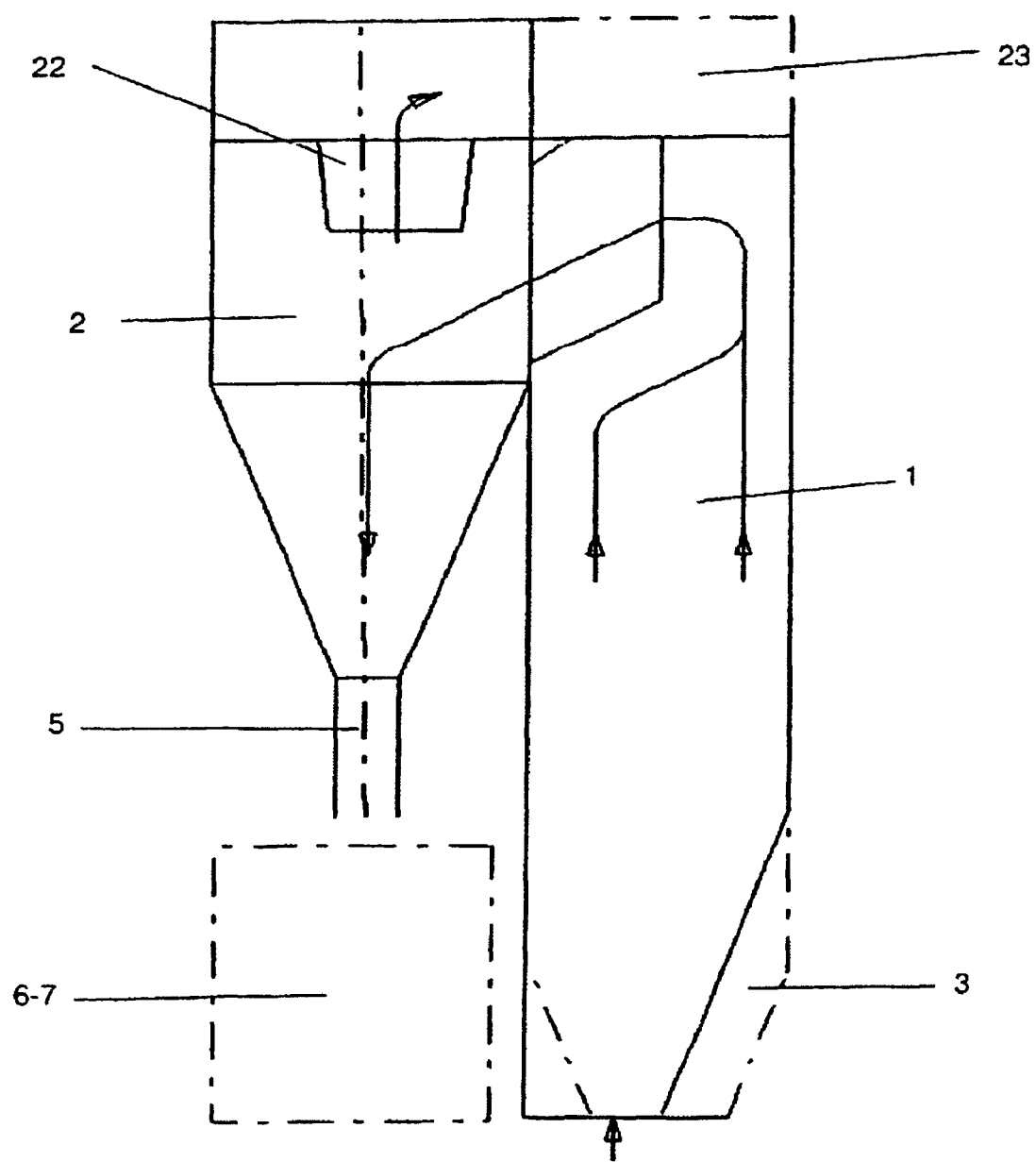
FIG. 11 is a view in elevation of the second variant of the boiler or the reactor.

In the second variant of the boiler, shown in FIG. 11, all configurations of the beds 7 and the siphons 6 are feasible.

The duct 4 can take various forms.

Figure 12:
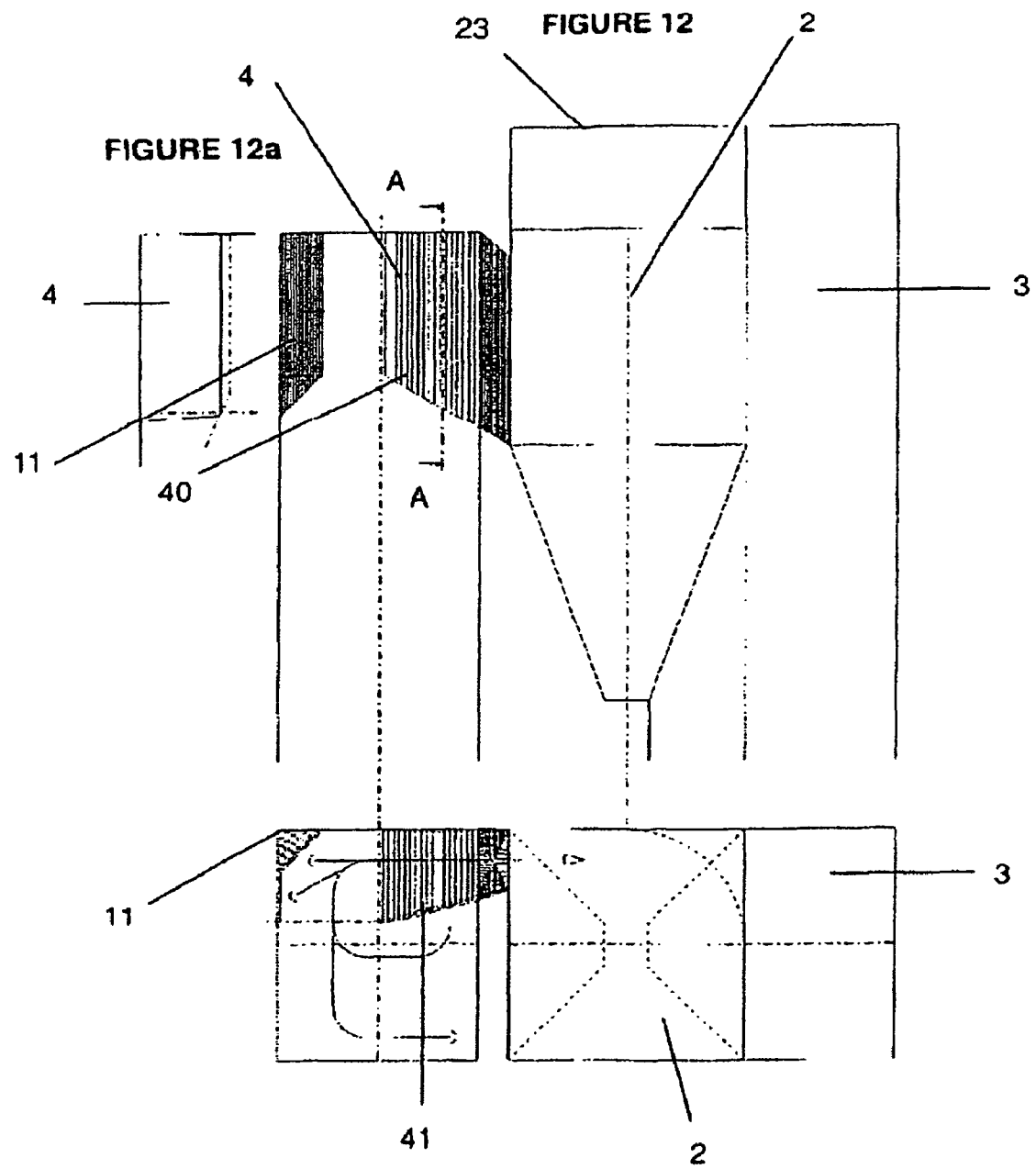
FIG. 12 is a detail view in elevation of a first version of the integral duct.
Figure 13:
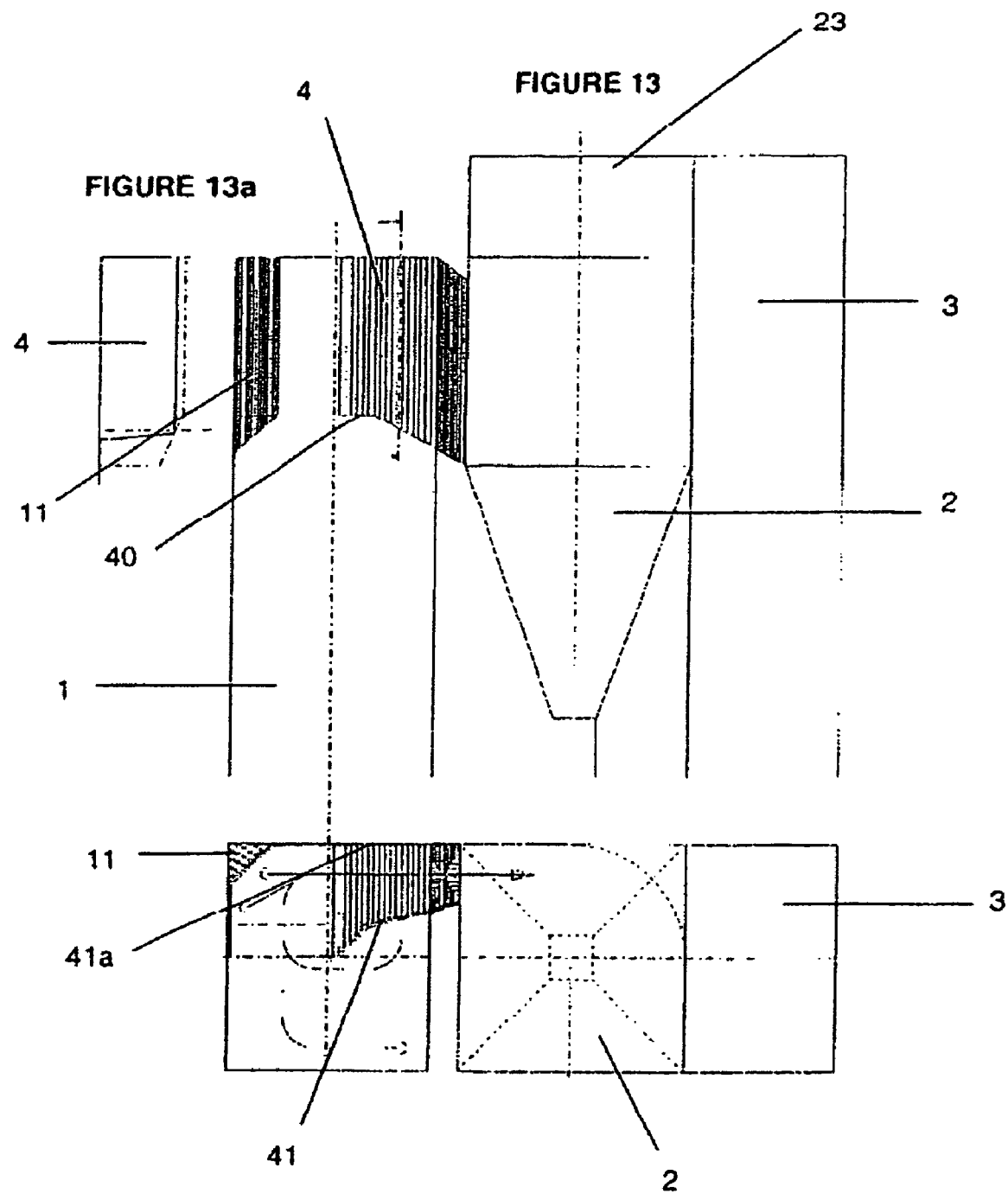
FIG. 13 is a detail view in elevation of a second version of the integrated duct.
Figure 14:
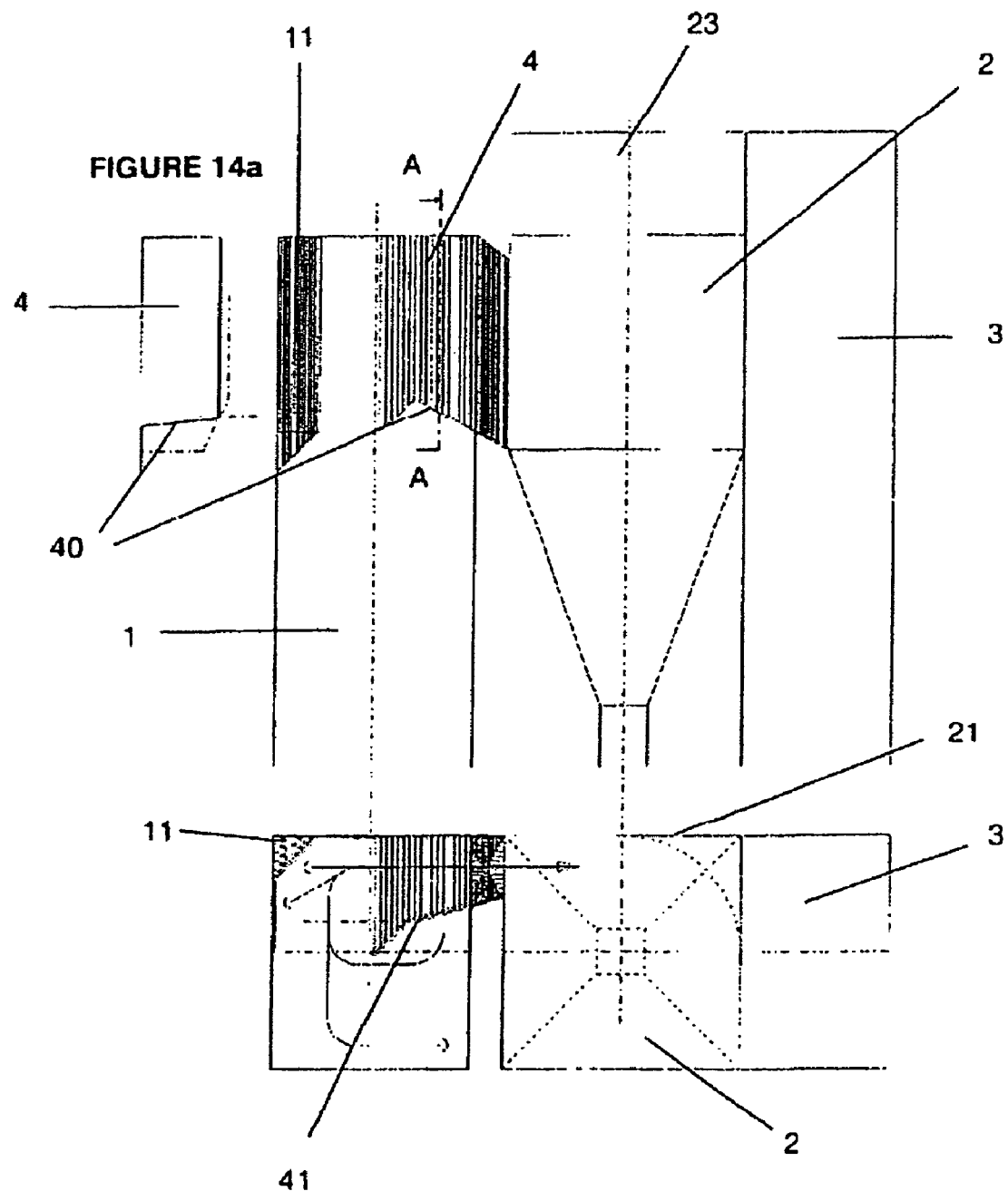
FIG. 14 is a detail view in elevation of a third version of the integrated duct.

In FIGS. 12, 13 and 14 the duct 4 is integrated into the reaction chamber 1 and is straight with a substantially rectangular section inlet aligned with the axis of the duct 4. The floor 40 is slightly inclined toward the exterior of the reaction chamber 1 (FIGS. 12*a*, 13*a*, 14*a*) in order to direct the particles toward the face 42 of the duct 4 which is aligned with the solids capturing face 21 in the separator 2.

The floor 40 of the duct 4 is inclined from the interior of the reaction chamber 1 toward the exterior (see FIG. 12) and from the inlet of the duct toward the separator 2. The interior wall 41 of the duct 4 converges toward the separator 2 (see FIG. 12*b*).

A deflector 11 is placed at the top of the reaction chamber 1 and facing the inlet of the duct 4 (FIGS. 12, 13, 14) in order to facilitate the entry of particles into the duct 4. A variant, not shown, may be lacking said deflector 11.

In a second disposition, shown in FIG. 13, the section of the duct 4 changes. The floor 40 is first of all horizontal, as can be seen in FIG. 13, and is then inclined toward the separator 2. The section of the interior wall 41 changes (see FIG. 13*b*). The duct 4 is therefore progressively narrower in the direction toward the separator 2, which achieves good acceleration of the particles and the flue gases and therefore better separation of the particles from the gases.

In a third disposition, the floor 40 of the duct 4 is first directed toward the top of the reaction chamber 1 in order to reduce its section and then downward, as shown in FIG. 14. The section of the wall 41 changes (see FIG. 14*b*), as in the previous disposition (FIG. 13*b*).

In FIGS. 15 to 18, the inlet of the duct 46 is then perpendicular to the axis of the duct 4.

As in the previous situation, the section of the duct with an inlet mouth parallel to the extrados of the duct is substantially rectangular with a slight slope toward the exterior in the area 43 of the duct 4 (FIGS. 15*a*, 16*a*, 17*a*, 18*a*).

Figure 15:
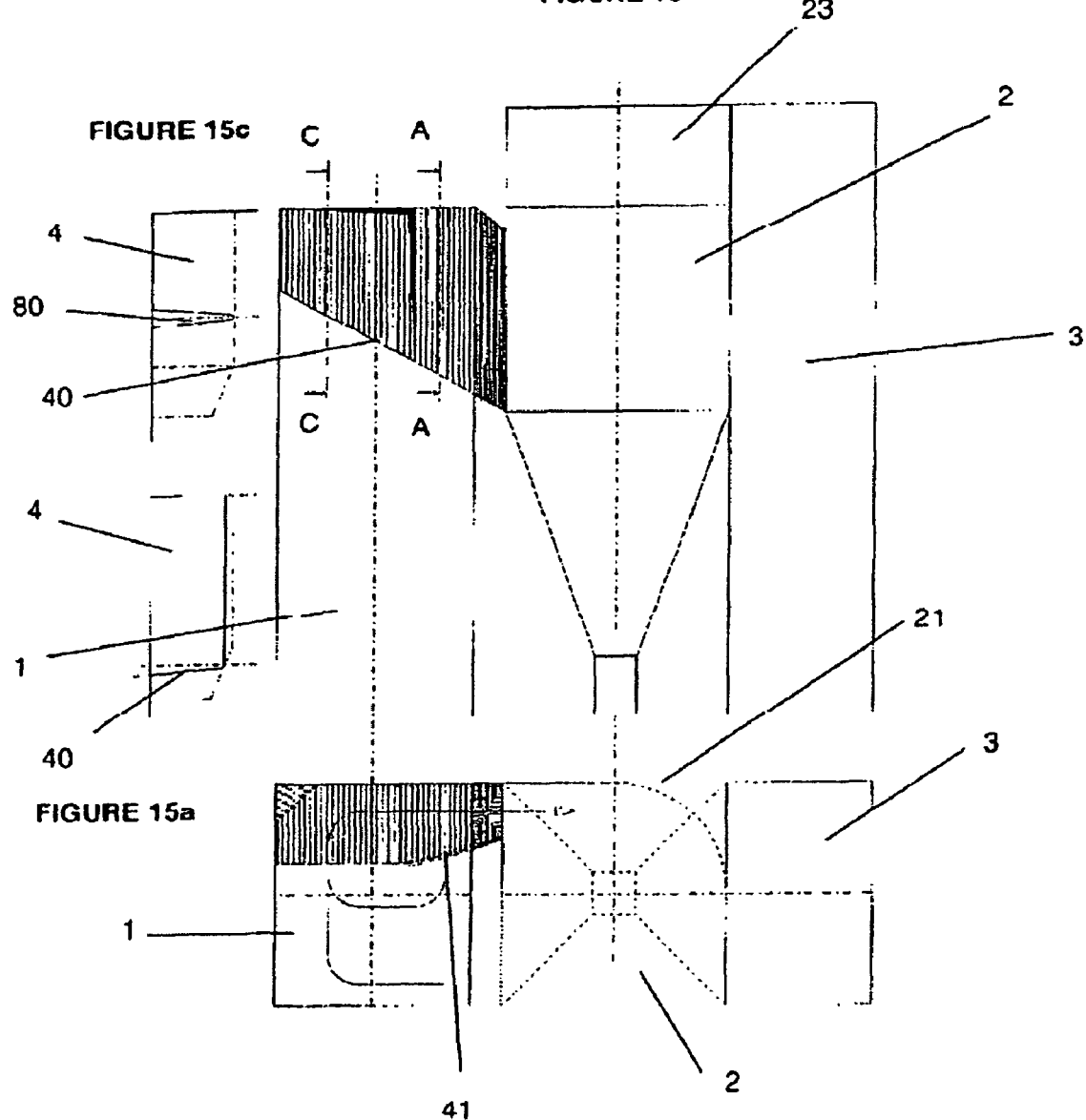
FIG. 15 is a detail view in elevation of a fourth version of the integrated duct.

In a first disposition, shown in FIG. 15, the floor 40 slopes toward the separator 2. The floor 40 is slightly inclined toward the exterior of the reaction chamber 1 (FIGS. 15*a*, 16*a*, 17*a*, 18*a*) in order to direct the particles toward the face 42 of the duct 4 which is aligned with the solids capturing face 21 in the separator 2. The floor 40 can be rounded toward the wall of the reaction chamber in order to constitute a deflector (not shown).

The wall 41 converges toward the separator 2 (see FIGS. 15*b*, 16*b*, 17*b*, 18*b*) to accelerate the particles and the flue gases.

Figure 16:
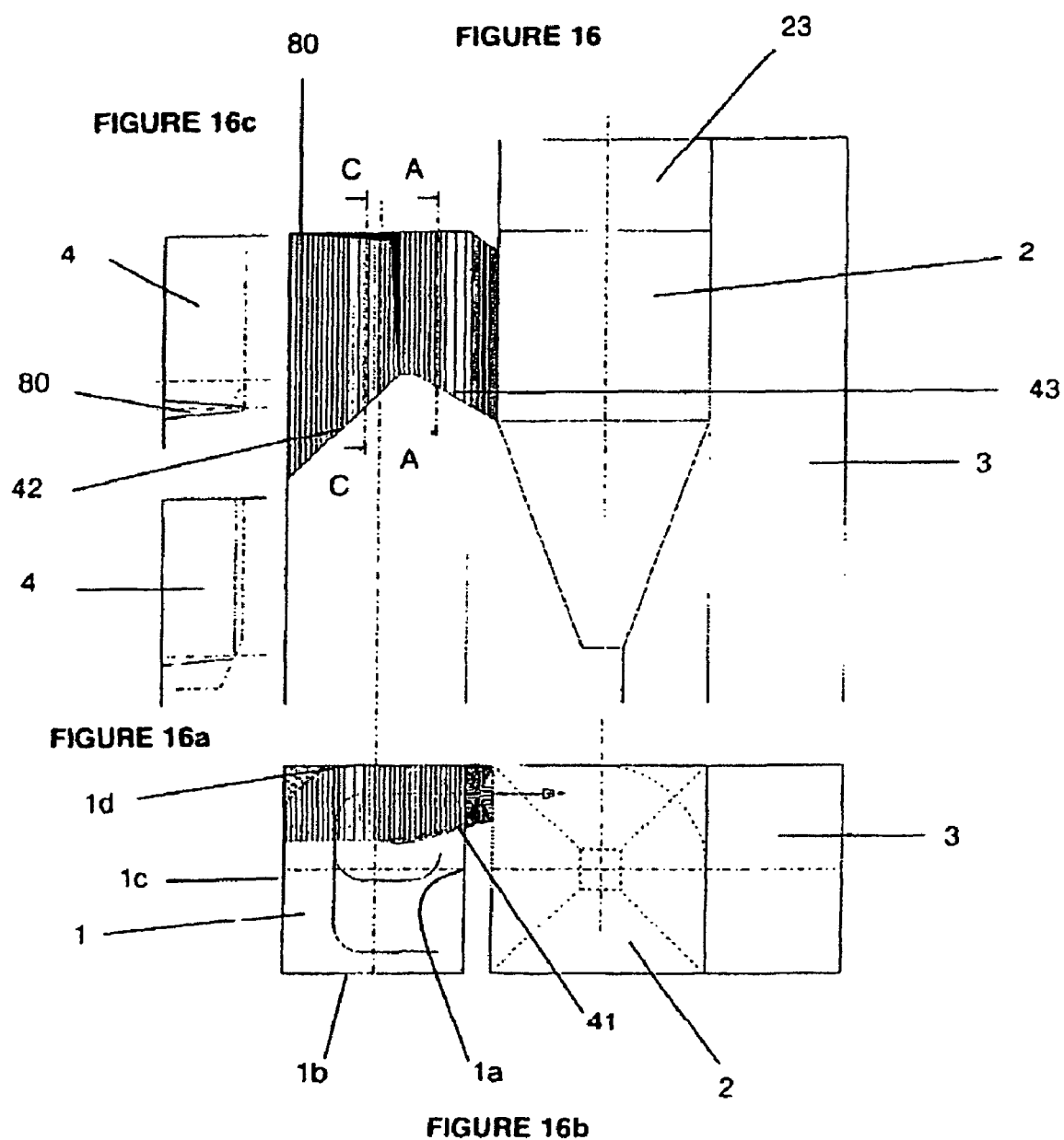
FIG. 16 is a detail view in elevation of a fifth version of the integrated duct.
Figure 17:
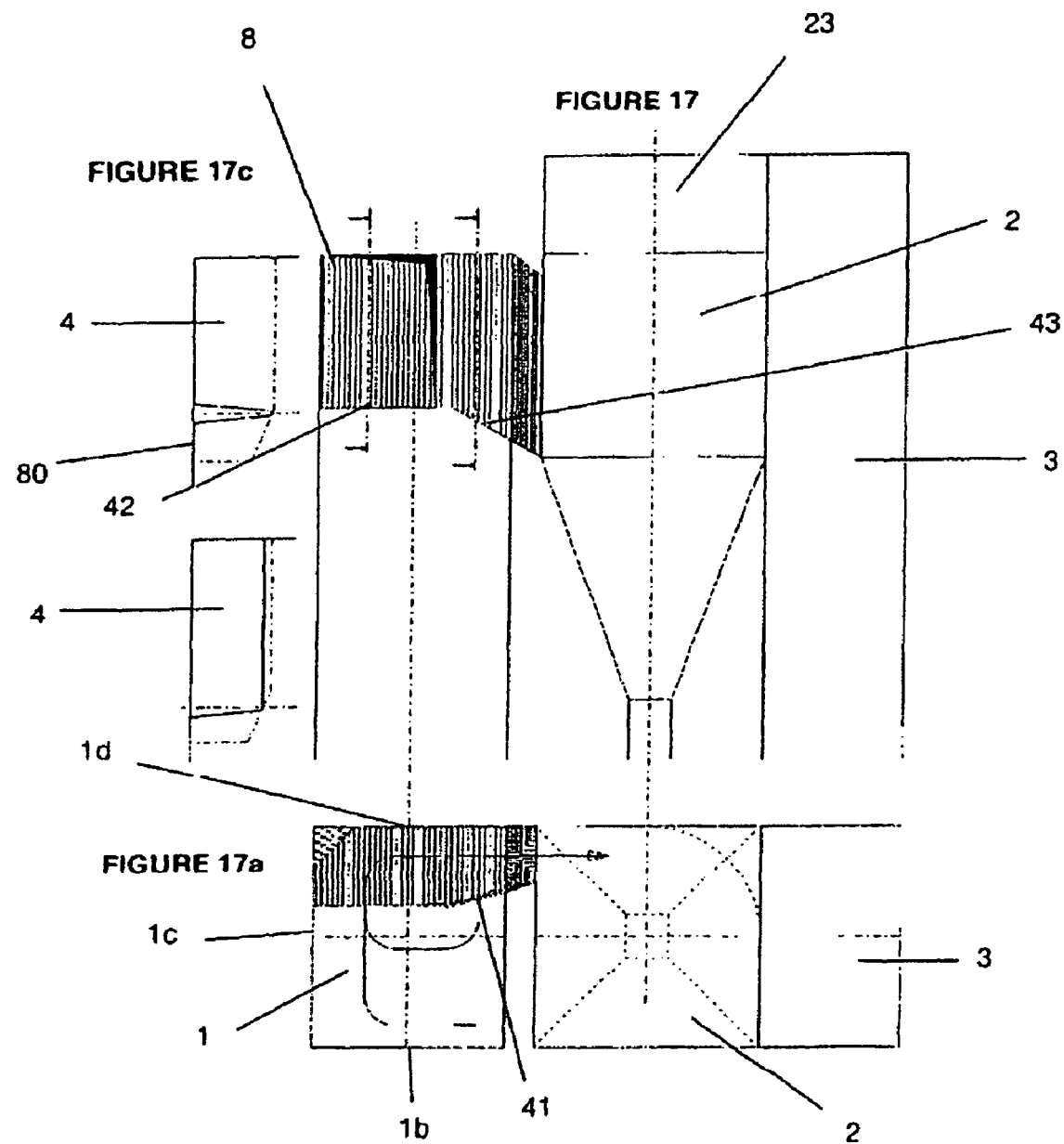
FIG. 17 is a detail view in elevation of a sixth version of the integrated duct.
Figure 18:
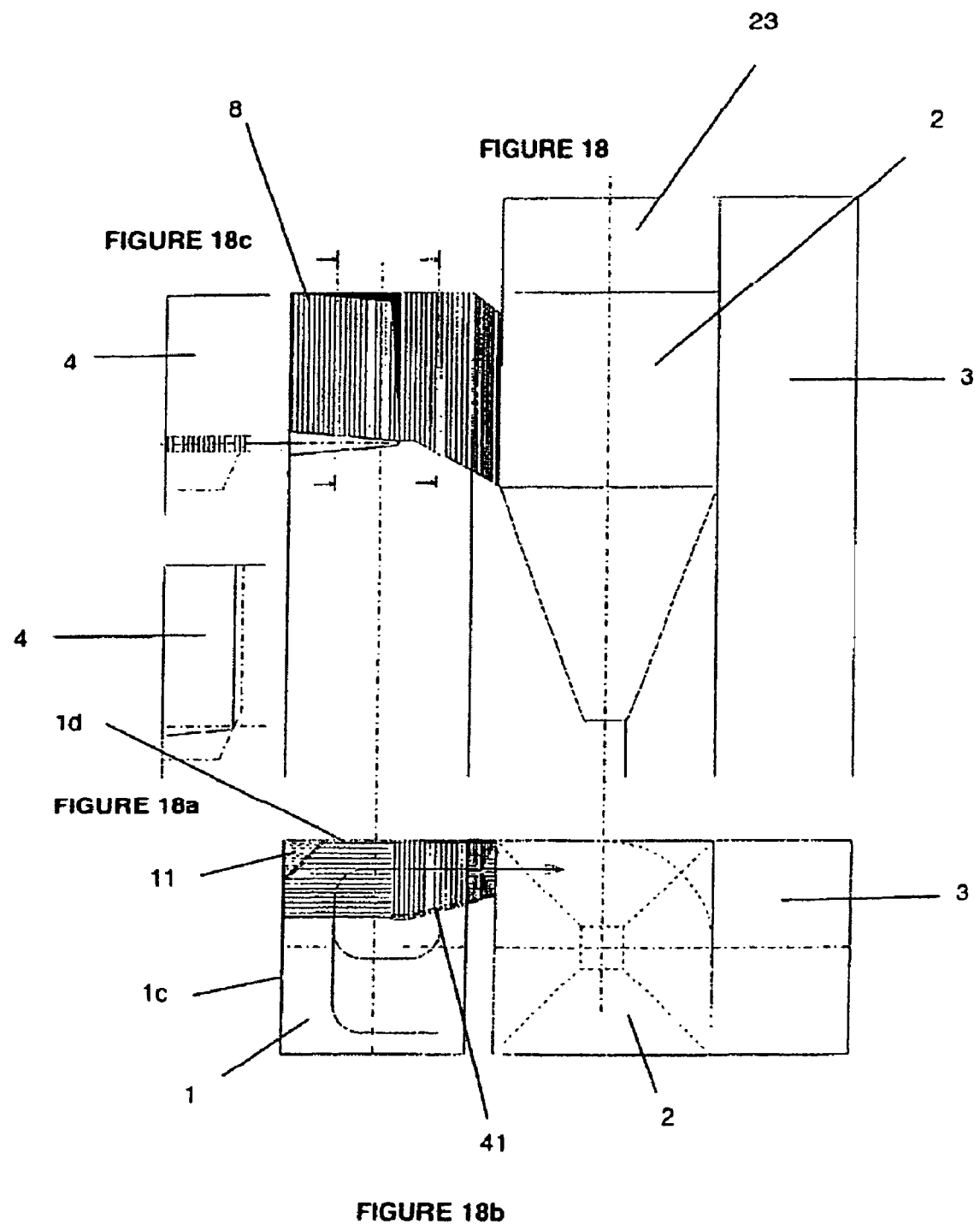
FIG. 18 is a detail view in elevation of a seventh version of the integrated duct.

In a second disposition, shown in FIG. 16, the floor 40 is first of all directed upward in the area 42 corresponding to the inlet of the duct 4. This encourages the entry of the particles and the gases into the duct 4. In the next area 43 the floor is directed downward, as in the previous disposition.

In the third disposition (see FIG. 17), the floor 40 is horizontal in the area 42 of the inlet of the duct 4 and then slopes in the area 43, as in the previous disposition.

In all the above variants, the reaction chamber 1 and the ducts 4 are tubed. The tubes 8 constituting the tubing of the ducts 4 are fed with heat-exchange fluid via the tubes of the wall 1*c* or 1*d* of the reaction chamber 1.

In the variant in which the ducts 4 are bent, the floor 40 of the inlet of said duct 4 corresponding to the area 42 consists of tubes 80 coming from and returning to the wall 1*c* (FIG. 18*c*) or 1*d* (FIGS. 15*c*, 16*c*, 17*c*) of the reaction chamber 1. The tube 80 thus performs a round trip which constitutes the floor 40 in the area 42 of the duct 4 (FIGS. 15*c* to 18*c*).

Figure 19:
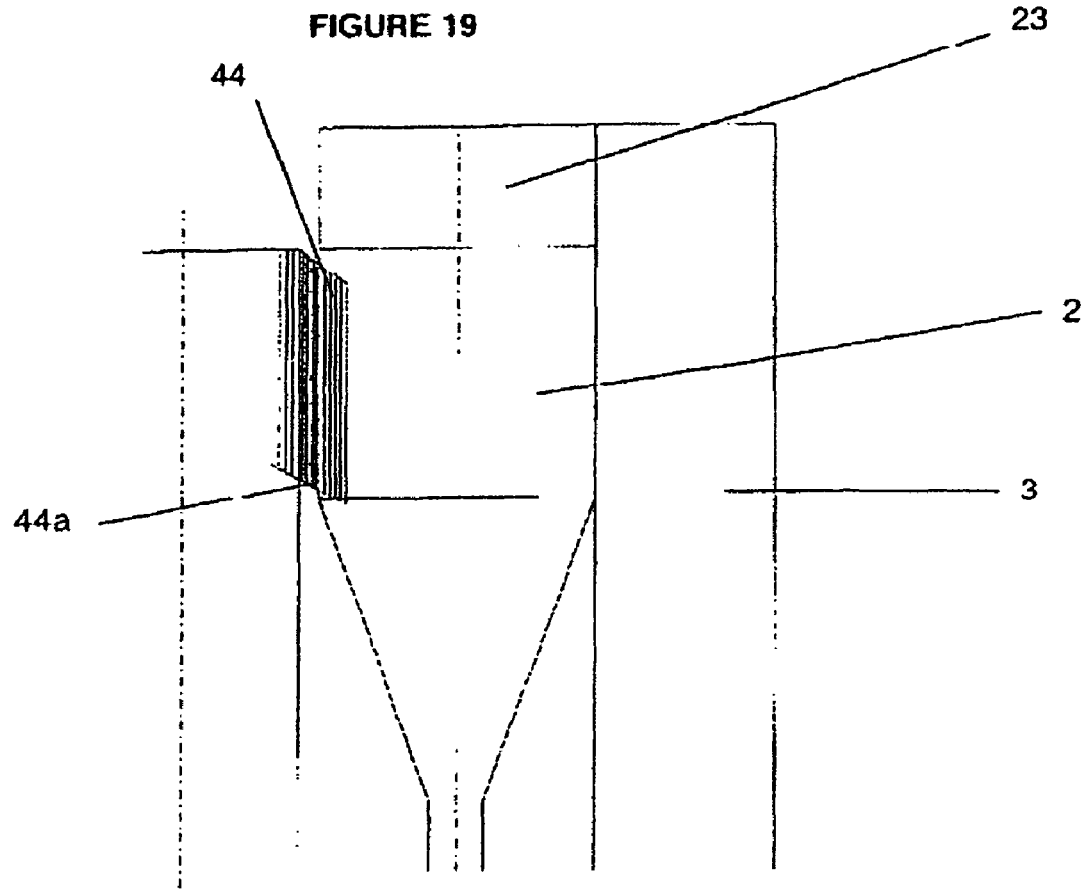
FIG. 19 is a detail view in elevation of the duct with its end portion partly in the separator and partly between the reaction chamber and the separator.

The duct 4 can be continued by end portion 44, which is integrated or not, and partly or totally inside the separator 2 (FIGS. 19 to 21).

If this portion 44 of the duct 4 is totally inside the reaction chamber 1 (FIG. 21, 21*a*), the tubes 8 of the walls of the duct 4 are diverted portions of those of the reaction chamber 1, in the case of the floor 40 and the wall 41, or of the tubes of the wall of the reaction chamber 1 in the case of the wall 41*a*.

If the portion 44 is integrated totally or partly in the separator 2, the tubes 8 of the walls of the duct 4 are tubes diverted from those of the separator 2 in the case of the portion inside the separator 2 (FIGS. 19, 19*a*, 20, 20*a*).

Figure 19A:
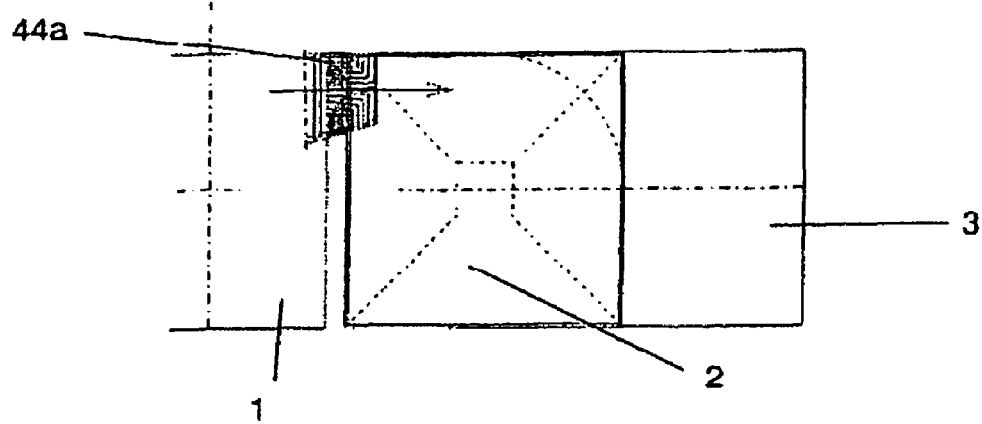
FIG. 19a is a plan view of the duct from FIG. 19.

The portion 44*a* between the reaction chamber 1 and the separator 2 is also tubed, by means of diverted tubes that can come from the reaction chamber 1 and/or the separator 2 (FIGS. 19, 19*a*).

A boiler or a reactor comprising two or more modules is made up by juxtaposing two or more modules (see FIG. 22). In FIG. 22, the boiler or the reactor comprises two basic modules conforming to the first variant and positioned symmetrically with respect to the reaction chamber 1.

The reaction chamber 1 is the combination of the two basic reaction chambers and constitutes a divided bottom reaction chamber 1*e*.

The two separators 2 on respective opposite sides of the reaction chamber 1 are connected to the rear cage 3 by connecting ducts 23.

In the configuration shown in FIG. 22, there is only one rear cage 3; the connecting duct 23*a* returns to the rear cage 3 along the top of the reaction chamber 1, whereas the other duct 23*b* has direct access to said cage 3. This configuration with a single rear cage is more compact.

A deflector 45 is disposed in the top of the duct 4 on the side from which the gases exit toward the separator 2.

As can be seen in FIGS. 25 to 31, another variant is possible in which the connecting duct 23 for evacuating the gases is placed inside said cyclone 2; a deflector (not shown) may be installed in the ceiling of the separator 2 in order to facilitate the entry of the gases into the duct 23. The evacuation of the gases via the duct 23 starts above the conical (polygonal or circular) portion 24 of the separator 2 and descends to the bottom of said separator 2, and the duct 23 is therefore sufficiently rigid to support the separator 2. The assembly comprising the reaction chamber 1—separator 2—rear cage 3 is placed on concrete slabs 9 via a beam 90.

In FIG. 25, the separator 2 is supported by the duct 5, the siphon 6 and the duct 23. The gases are evacuated from the separator 2 by the duct 23, which directs the gas downwards and then directs them toward the rear cage, where they rise up before exiting.

In FIG. 26, the separator is supported by the duct 5, the siphon 6 and the exterior bed 7 only. Here, .the gases are evacuated as before by the duct 23, which directs the gases to the mid-height of the separator 2 and raises them before they descend into the rear cage 3, whence they exit via the bottom of said cage 3.

In FIG. 27, the separator is supported by the duct 5 and the assembly comprising the siphon 6 and the external bed 7 only. The gases are evacuated at mid-height and directed toward the horizontally disposed rear cage 3 via the duct 23.

Figure 28:
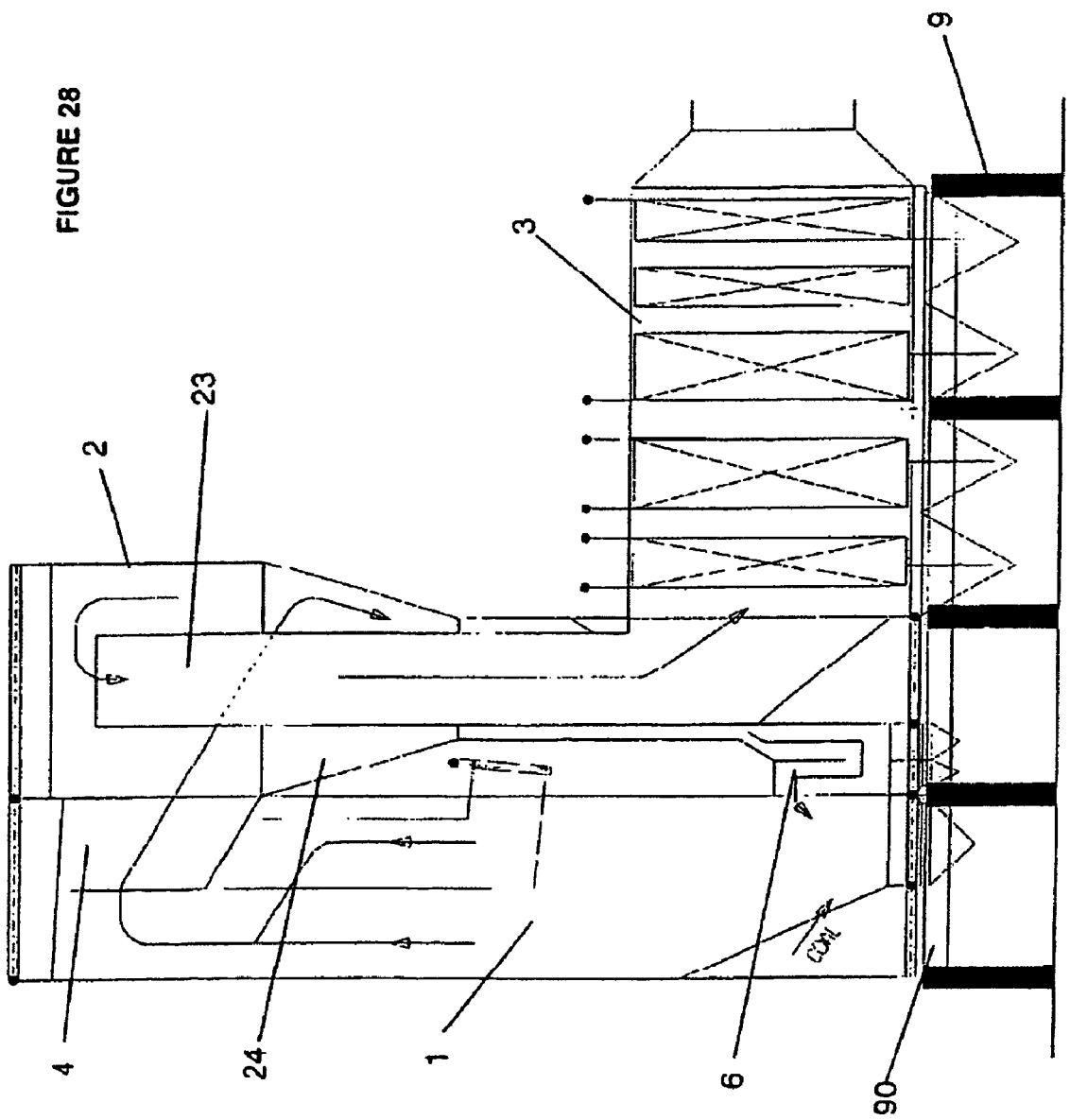
FIG. 28 is a view in elevation of a boiler or a reactor according to the invention with evacuation of gases at the bottom and a horizontal rear cage in a bottom position.

FIG. 28 represents a variant in which the separator 2 is supported by the duct 5, the siphon 6 and the duct 23 and the rear cage 3 is disposed horizontally.

FIG. 28*a* represents a variant of FIG. 28 in which the assembly comprising the hearth 1 and the separator 2 is suspended at mid-height on a metallic framework 91. This configuration means that the framework can be much lower than conventional frameworks.

Figure 29:
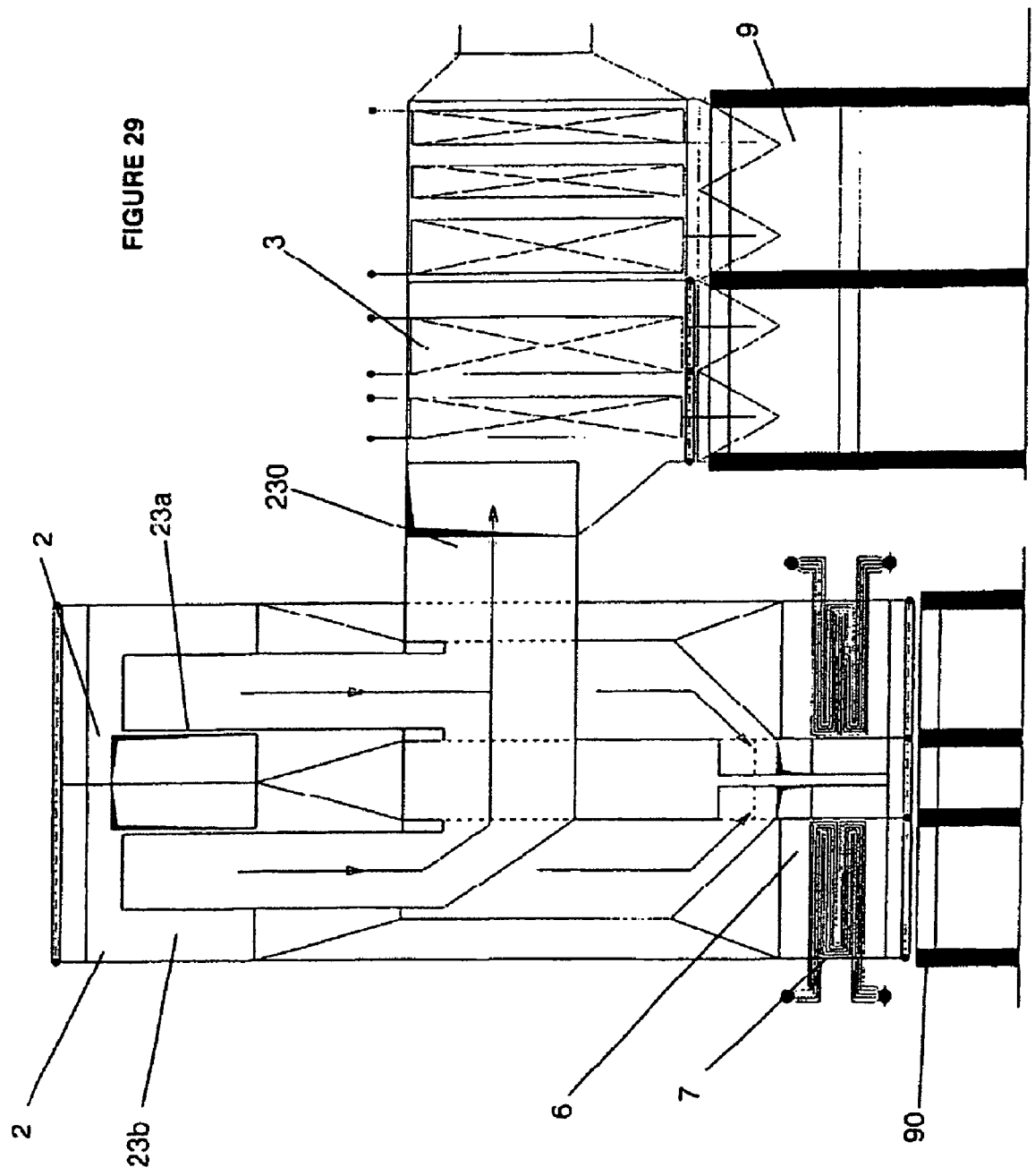
FIG. 29 is a view in elevation of a boiler or a reactor according to the invention with evacuation of gases at the bottom and a horizontal rear cage at mid-height common to two separators.

FIG. 29 shows a variant in which two separators 2 feed the same rear cage 3. The two ducts 23*a* and 23*b* join in a common duct 230 that joins the rear cage 3, which is disposed horizontally in this figure. The separator 2 is supported by the duct 5, the siphon 6 and the external bed 7.

Figure 30:
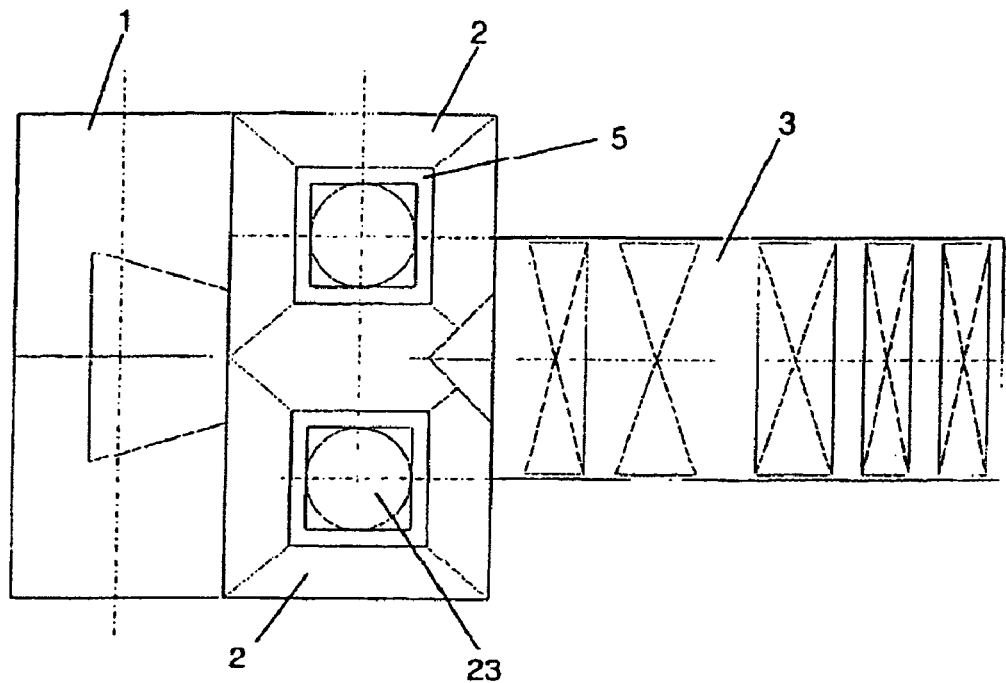
FIGS. 30 and 31 are top views of a boiler or a reactor according to the invention with a rear cage common to one or two reaction chambers.

FIG. 30 represents the assembly comprising the reaction chamber 1, separator 2 and rear cage 3 adjoining a horizontal rear cage 3 common to the two separators 2, this assembly constituting a double module.

Figure 31:
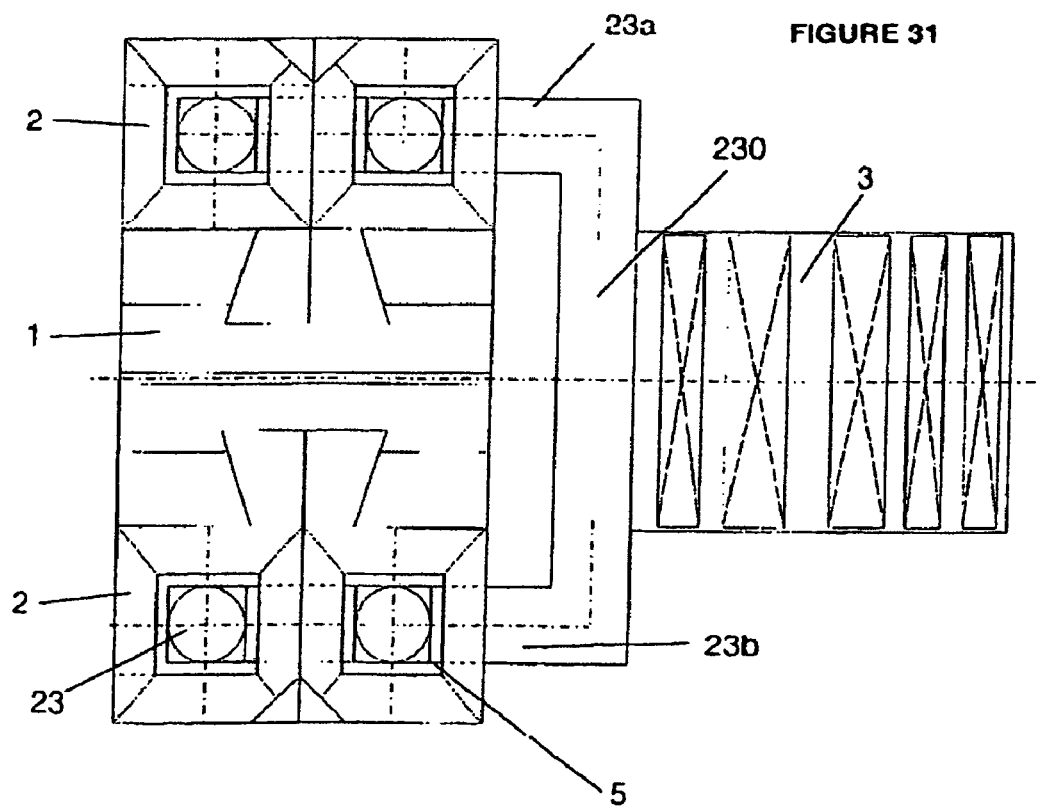

FIG. 31 shows another module variant consisting of two reaction chambers 1, four separators 2 and a single horizontal rear cage 3 common to the four separators 2.

The invention claimed is:

1. A circulating fluidized bed reactor comprising:
   a reaction chamber that provides hot gases having particles;
   a centrifugal separator having a separation chamber that separates particles from the hot gases coming from the reaction chamber, wherein the reaction chamber and the separation chamber have a common wall disposed therebetween, the common wall having opposing sides, whereby one opposing side defines at least a portion of a wall of the reaction chamber and the other opposing side defines at least a least a portion of a wall of the separation chamber; and
   an acceleration duct disposed to provide fluid communication of the hot gases between the reaction chamber and the separation chamber of the centrifugal separator, wherein at least part of the acceleration duct is disposed within the reaction chamber.

2. The circulating fluidized bed reactor of claim 1, wherein the common wall is a single wall.

3. The circulating fluidized bed reactor of claim 1, wherein the common wall is a double wall.

4. The circulating fluidized bed reactor of claim 1, wherein the common wall is straight.

5. The circulating fluidized bed reactor of claim 1, wherein the acceleration duct is disposed entirely in the reaction chamber.

6. The circulating fluidized bed reactor of claim 1, wherein the at least part of the acceleration duct is disposed in the top of the reaction chamber.

7. The circulating fluidized bed reactor of claim 1, wherein the acceleration duct has an extrados whereby an inlet mouth of the acceleration duct is substantially parallel to the extrados of the acceleration duct.

8. The circulating fluidized bed reactor of claim 1, wherein the acceleration duct has an extrados whereby an inlet mouth of the acceleration duct is substantially perpendicular to the extrados of the acceleration duct.

9. The circulating fluidized bed reactor of claim 1, further including a rear cage wherein the rear cage and the reaction chamber have a common wall.

10. The circulating fluidized bed reactor of claim 1, further including a rear cage wherein the rear cage and the separation chamber of the centrifugal separator have a common wall.

11. The circulating fluidized bed reactor of claim 1, wherein the reaction chamber, the centrifugal separator, and a rear cage are aligned.

12. The circulating fluidized bed reactor of claim 1, wherein the reaction chamber, the centrifugal separator, and a rear cage are disposed at a right angle.

13. The circulating fluidized bed reactor of claim 1, further including a deflector disposed in the reaction chamber that directs particles to the acceleration duct.

14. The circulating fluidized bed reactor of claim 1, wherein the acceleration duct includes a floor that is inclined toward the centrifugal separator.

15. The circulating fluidized bed reactor of claim 1, further including a rear cage that is horizontal.

16. The circulating fluidized bed reactor of claim 1, further including a rear cage that is situated under the centrifugal separator.

17. The circulating fluidized bed reactor of claim 1, further including:
   a secondary centrifugal separator having a secondary separation chamber that separates particles from the hot gases coming from the reaction chamber, wherein the reaction chamber and the secondary separation chamber have a common wall therebetween; and
   a secondary acceleration duct disposed to provide fluid communication of the hot gases between the reaction chamber and the secondary separation chamber of the secondary centrifugal separator, wherein at least part of the secondary acceleration duct is disposed within the reaction chamber.

18. A circulating fluidized bed reactor comprising:
   a reaction chamber that provides hot gases having particles;
   a centrifugal separator having a separation chamber that separates particles from the hot gases coming from the reaction chamber, wherein a wall the reaction chamber and a wall of the separation chamber of the centrifugal separator are contiguous; and
   an acceleration duct disposed to provide fluid communication of the hot gases between the reaction chamber and the separation chamber of the centrifugal separator, wherein at least part of the acceleration duct is disposed within the reaction chamber.

19. The circulating fluidized bed reactor of claim 18, wherein the wall of the reaction chamber and the wall of the centrifugal separator are straight.

20. The circulating fluidized bed reactor of claim 18, wherein the acceleration duct is disposed entirely in the reaction chamber.

21. The circulating fluidized bed reactor of claim 18, wherein the acceleration duct has an extrados whereby an inlet mouth of the acceleration duct is substantially parallel to the extrados of the acceleration duct.

22. The circulating fluidized bed reactor of claim 18, wherein the acceleration duct has an extrados whereby an inlet mouth of the acceleration duct is substantially perpendicular to the extrados of the acceleration duct.

23. The circulating fluidized bed reactor of claim 18, further including a rear cage wherein the rear cage and the reaction chamber have a common wall.

24. The circulating fluidized bed reactor of claim 18, further including a rear cage wherein the rear cage and the separation chamber of the centrifugal separator have a common wall.

25. The circulating fluidized bed reactor of claim 18, wherein the reaction chamber, the centrifugal separator, and a rear cage are aligned.

26. The circulating fluidized bed reactor of claim 18, wherein the reaction chamber, the centrifugal separator, and a rear cage are disposed at a right angle.

27. The circulating fluidized bed reactor of claim 18, further including a deflector disposed in the reaction chamber that directs particles to the acceleration duct.

28. The circulating fluidized bed reactor of claim 18, wherein the acceleration duct includes a floor that is inclined toward the centrifugal separator.

29. The circulating fluidized bed reactor of claim 18, further including a rear cage that is situated under the centrifugal separator.

30. The circulating fluidized bed reactor of claim 18, further including:

a secondary centrifugal separator having a secondary separation chamber that separates particles from the hot gases coming from the reaction chamber, wherein the reaction chamber and the secondary separation chamber have a common wall therebetween; and a secondary acceleration duct disposed to provide fluid communication of the hot gases between the reaction chamber and the secondary separation chamber of the secondary centrifugal separator, wherein at least part of the secondary acceleration duct is disposed within the reaction chamber.

31. A circulating fluidized bed reactor comprising:
a reaction chamber that provides hot gases having particles;
a centrifugal separator having a separation chamber that separates particles from the hot gases coming from the reaction chamber;
an acceleration duct disposed to provide fluid communication of the hot gases between the reaction chamber and the centrifugal separator, wherein at least part of the acceleration duct is disposed within the reaction chamber; and
a deflector disposed in the reaction chamber that directs particles to the acceleration duct.

32. The circulating fluidized bed reactor of claim 31, wherein the deflector comprises tubes diverted from at least one wall of the reaction chamber.

33. The circulating fluidized bed reactor of claim 31, wherein the deflector is formed by rounding a floor of the acceleration duct.

34. A circulating fluidized bed reactor comprising:
a reaction chamber that provides hot gases having particles;
a centrifugal separator having a separation chamber that separates particles from the hot gases coming from the reaction chamber;
an acceleration duct disposed to provide fluid communication of the hot gases between the reaction chamber and the centrifugal separator, wherein at least part of the acceleration duct is disposed within the separation chamber of the centrifugal separator.

35. A circulating fluidized bed reactor of claim 18, wherein the wall of the reaction chamber and the wall of separation chamber are facing each other.

* * * * *